US011862178B2

(12) United States Patent
Shin et al.

(10) Patent No.: US 11,862,178 B2
(45) Date of Patent: Jan. 2, 2024

(54) ELECTRONIC DEVICE FOR SUPPORTING ARTIFICIAL INTELLIGENCE AGENT SERVICES TO TALK TO USERS

(71) Applicant: Samsung Electronics Co., Ltd., Suwon-si (KR)

(72) Inventors: Hoseon Shin, Suwon-si (KR); Chulmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 17/572,095

(22) Filed: Jan. 10, 2022

(65) Prior Publication Data

US 2022/0270617 A1 Aug. 25, 2022

Related U.S. Application Data

(63) Continuation of application No. PCT/KR2021/016989, filed on Nov. 18, 2021.

(30) Foreign Application Priority Data

Feb. 19, 2021 (KR) ........................ 10-2021-0022435

(51) Int. Cl.
*G10L 17/18* (2013.01)
*G10L 25/63* (2013.01)
*G10L 25/78* (2013.01)

(52) U.S. Cl.
CPC .............. *G10L 17/18* (2013.01); *G10L 25/63* (2013.01); *G10L 25/78* (2013.01); *G10L 2025/783* (2013.01)

(58) Field of Classification Search
CPC ......... G10L 17/18; G10L 25/63; G10L 25/78; G10L 2025/783; G10L 15/26; G06N 3/04;
(Continued)

(56) References Cited

U.S. PATENT DOCUMENTS

| 10,838,689 B2 | 11/2020 | Harrison et al. |
| 2012/0034904 A1 | 2/2012 | Lebeau et al. |

(Continued)

FOREIGN PATENT DOCUMENTS

| JP | 2002/189496 A | 7/2002 |
| JP | 2020-030231 A | 2/2020 |

(Continued)

OTHER PUBLICATIONS

International Search Report and written opinion dated Feb. 21, 2022, issued in International Application PCT/KR2021/016989.

*Primary Examiner* — Fariba Sirjani
(74) *Attorney, Agent, or Firm* — Jefferson IP Law, LLP

(57) ABSTRACT

An electronic device and method are provided. The method includes identifying a speech section of a user and a speech section of a neighbor in a received audio signal, identifying a user utterance in the speech section of the user and a neighbor answer to the user utterance in the speech section of the neighbor, obtaining preference information associated with the user utterance, giving a first reliability to the neighbor answer and a second reliability to an agent answer of an artificial intelligence agent generated in response to the user utterance, based on the preference information, not responding to the user utterance when the second reliability is lower than the first reliability, and outputting the agent answer when the second reliability is equal to or higher than the first reliability.

18 Claims, 14 Drawing Sheets

(58) Field of Classification Search
CPC ...... G06N 5/02; G06N 20/00; G06F 16/3344;
G06F 40/216; G06F 40/35; G06F 40/30
See application file for complete search history.

(56) References Cited

U.S. PATENT DOCUMENTS

| | | |
|---|---|---|
| 2014/0334645 A1 | 11/2014 | Yun et al. |
| 2015/0081296 A1 | 3/2015 | Lee et al. |
| 2016/0063382 A1* | 3/2016 | Allen ........................ G06N 5/04 706/11 |
| 2019/0135304 A1 | 5/2019 | Kim et al. |
| 2019/0166403 A1 | 5/2019 | Yelton et al. |
| 2019/0243916 A1 | 8/2019 | Ashoori et al. |
| 2019/0392826 A1 | 12/2019 | Lee et al. |
| 2021/0134270 A1* | 5/2021 | Rakshit ................... G06F 3/167 |
| 2021/0400349 A1 | 12/2021 | Yelton et al. |
| 2022/0068263 A1* | 3/2022 | Roy ........................ G06F 40/30 |
| 2022/0093094 A1* | 3/2022 | Krishnan ............. G06V 40/161 |
| 2022/0270617 A1* | 8/2022 | Shin ........................ G06F 40/30 |

FOREIGN PATENT DOCUMENTS

| | | |
|---|---|---|
| KR | 10-2019-0051600 A | 5/2019 |
| KR | 10-2020-0000604 A | 1/2020 |
| KR | 10-2020-0051173 A | 5/2020 |
| KR | 10-2020-0094162 A | 8/2020 |
| KR | 10-2020-0105325 A | 9/2020 |

\* cited by examiner

ELECTRONIC DEVICE FOR SUPPORTING ARTIFICIAL INTELLIGENCE AGENT SERVICES TO TALK TO USERS

CROSS-REFERENCE TO RELATED APPLICATION(S)

This application is a continuation application, claiming priority under § 365(c), of an International application No. PCT/KR2021/016989, filed on Nov. 18, 2021, which is based on and claims the benefit of a Korean patent application number 10-2021-0022435, filed on Feb. 19, 2021, in the Korean Intellectual Property Office, the disclosure of which is incorporated by reference herein in its entirety.

TECHNICAL FIELD

The disclosure relates to an electronic device for providing an artificial intelligence (AI) agent service for a user in response to a user utterance.

BACKGROUND ART

An artificial intelligence system is a computer system for implementing humanlike intelligence, which enables machines to autonomously learn and make a judgment and has an improved recognition rate the more the system is used.

Artificial intelligence technology may include a machine learning (deep learning) technology using an algorithm that autonomously classifies/learns features of input data and element technologies for imitating recognition and determination functions of the human brain using the machine learning technology.

For example, the element technologies may include at least one of linguistic understanding technology of recognizing human languages/letters, visual understanding technology of recognizing objects like human eyes, inference/prediction technology of determining information and making logical inference and prediction, knowledge expression technology of processing human experience information into knowledge data, and motion control technology of controlling autonomous driving of a vehicle and the movement of a robot.

Linguistic understanding technology is a technology that recognizes and applies/processes human languages/letters and may include natural language processing, machine translation, a dialogue system, questioning and answering, speech recognition/composition, and the like. In one example of language understanding technology, an electronic device may recognize an utterance of a user using an automatic speech recognition (ASR) model generated by training with a machine learning technology, thereby generating text data corresponding to the utterance.

The electronic device may provide the user with an AI agent service that recognizes a section including the user's voice (utterance) in an audio signal, understands the user's intent in the user's utterance within the recognized section, and outputs a response corresponding to the user's intent as a voice.

The above information is presented as background information only to assist with an understanding of the disclosure. No determination has been made, and no assertion is made, as to whether any of the above might be applicable as prior art with regard to the disclosure

DETAILED DESCRIPTION OF THE INVENTION

Technical Problem

An agent may be called by a designated call utterance (e.g., Hi Bixby) or user handling of a physical or soft button.

Aspects of the disclosure are to address at least the above-mentioned problems and/or disadvantages and to provide at least the advantages described below. Accordingly, an aspect of the disclosure is to provide a participative agent service in which an agent participates in a conversation between a user and a neighbor.

Additional aspects will be set forth in part in the description which follows and, in part, will be apparent from the following description, or may be learned by practice of the presented embodiments.

Technical Solution

In accordance with an aspect of the disclosure, an electronic device is provided. The electronic device includes a speaker, a microphone, an audio connector, a wireless communication circuit, a processor configured to be operatively connected to the speaker, the microphone, the audio connector, and the wireless communication circuit, and a memory configured to be operatively connected to the processor, wherein the memory may store instructions that, when executed, cause the processor to identify a speech section of a user and a speech section of a neighbor in an audio signal received through the microphone, the audio connector, or the wireless communication circuit, identify a user utterance in the speech section of the user and a neighbor answer to the user utterance in the speech section of the neighbor, obtain preference information associated with the user utterance, give a first reliability to the neighbor answer and a second reliability to an agent answer of an artificial intelligence (AI) agent generated in response to the user utterance, based on the preference information, not respond to the user utterance when the second reliability is lower than the first reliability, and output the agent answer through the speaker, the audio connector, or the wireless communication circuit when the second reliability is equal to or higher than the first reliability.

In accordance with another aspect of the disclosure, a method for operating an electronic device is provided. The method includes identifying a speech section of a user and a speech section of a neighbor in an audio signal received through a microphone, an audio connector, or a wireless communication circuit provided in the electronic device, identifying a user utterance in the speech section of the user and a neighbor answer to the user utterance in the speech section of the neighbor, obtaining preference information associated with the user utterance, giving a first reliability to the neighbor answer and a second reliability to an agent answer of an artificial intelligence (AI) agent generated in response to the user utterance, based on the preference information, and outputting the agent answer through the speaker, the audio connector, or the wireless communication circuit when the second reliability is equal to or higher than the first reliability, without responding to the user utterance when the second reliability is lower than the first reliability.

In accordance with another aspect of the disclosure, an electronic device is provided. The electronic device includes a speaker, a microphone, an audio connector, a wireless communication circuit, a processor configured to be operatively connected to the speaker, the microphone, the audio connector, and the wireless communication circuit, and a memory configured to be operatively connected to the processor, wherein the memory may store instructions that, when executed, cause the processor to configure an artificial intelligence (AI) agent in a conversation mode of participating in a conversation between a user and a neighbor after the AI agent is called, and identify an utterance of the user in an audio signal received through the microphone, the audio connector, or the wireless communication circuit, and output an answer of the AI agent generated in response to the utterance of the user through the speaker, the audio connector, or the wireless communication circuit when an utterance of the neighbor is not identified in an audio signal received through the microphone, the audio connector, or the wireless communication circuit within a designated reference time from when the utterance of the user is identified, while the AI agent is configured in the conversation mode.

In accordance with another aspect of the disclosure, an electronic device is provided. The electronic device includes a speaker, a microphone, an audio connector, a wireless communication circuit, a processor configured to be operatively connected to the speaker, the microphone, the audio connector, and the wireless communication circuit, and a memory configured to be operatively connected to the processor, wherein the memory may store instructions that, when executed, cause the processor to configure an artificial intelligence (AI) agent in a conversation mode of participating in a conversation between a user and a neighbor after the AI agent is called, and identify a speech section of the user and a speech section of the neighbor in an audio signal received through the microphone, the audio connector, or the wireless communication circuit, identify a user utterance in the speech section of the user and a neighbor answer to the user utterance in the speech section of the neighbor, and output an answer of the AI agent generated in response to the user utterance through the speaker, the audio connector, or the wireless communication circuit when the neighbor answer includes designated utterance data or it is identified that the neighbor answer includes wrong information, while the AI agent is configured in the conversation mode.

Advantageous Effects

According to various embodiments, an electronic device may provide an AI agent service that enables continuous participation in a conversation between a user and a neighbor. In addition, various effects directly or indirectly identified through this document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
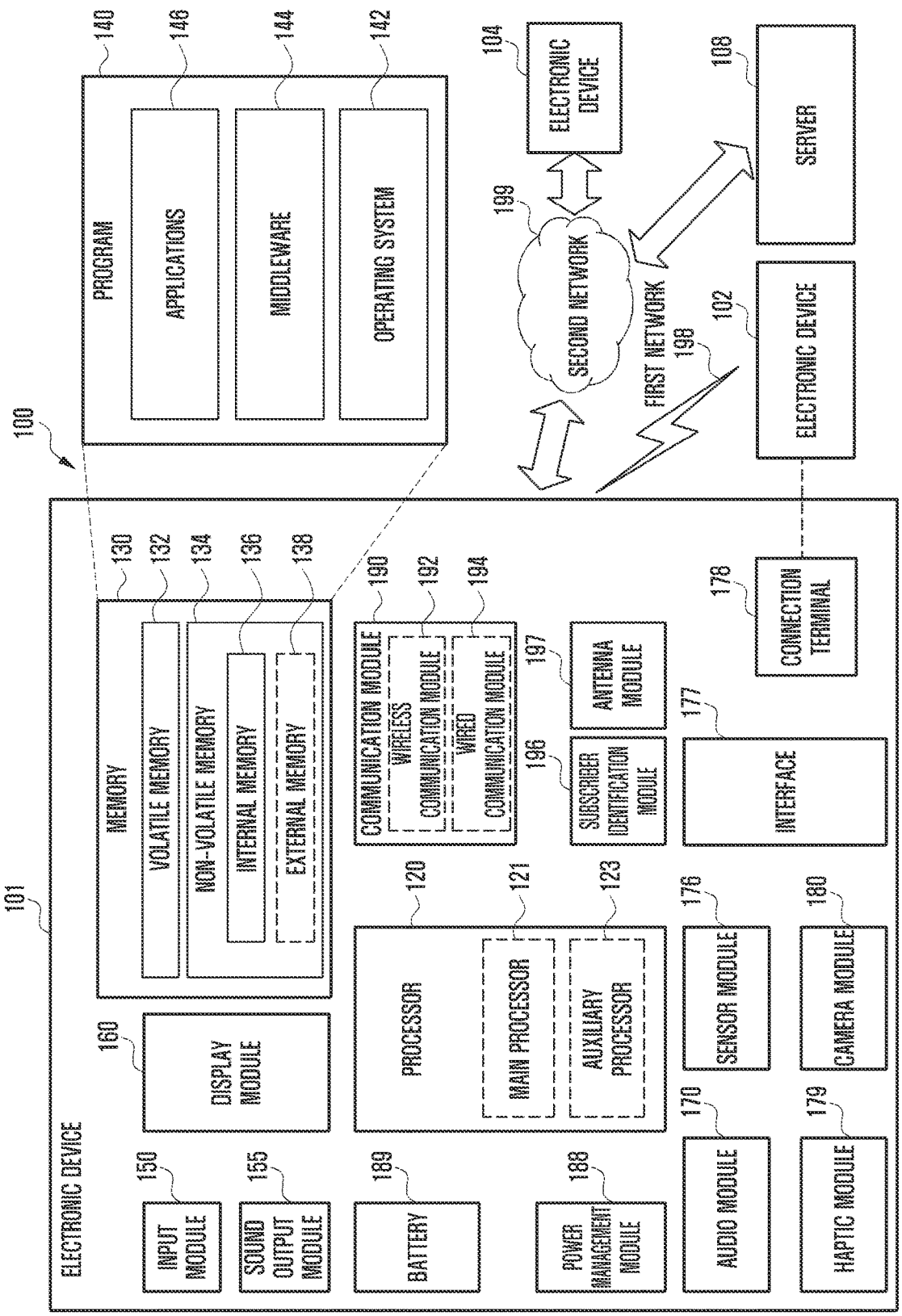
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an (external) electronic device 102 via a first network 198 (e.g., a short-range wireless communication network), or at least one of an (external) electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting (or connection) terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
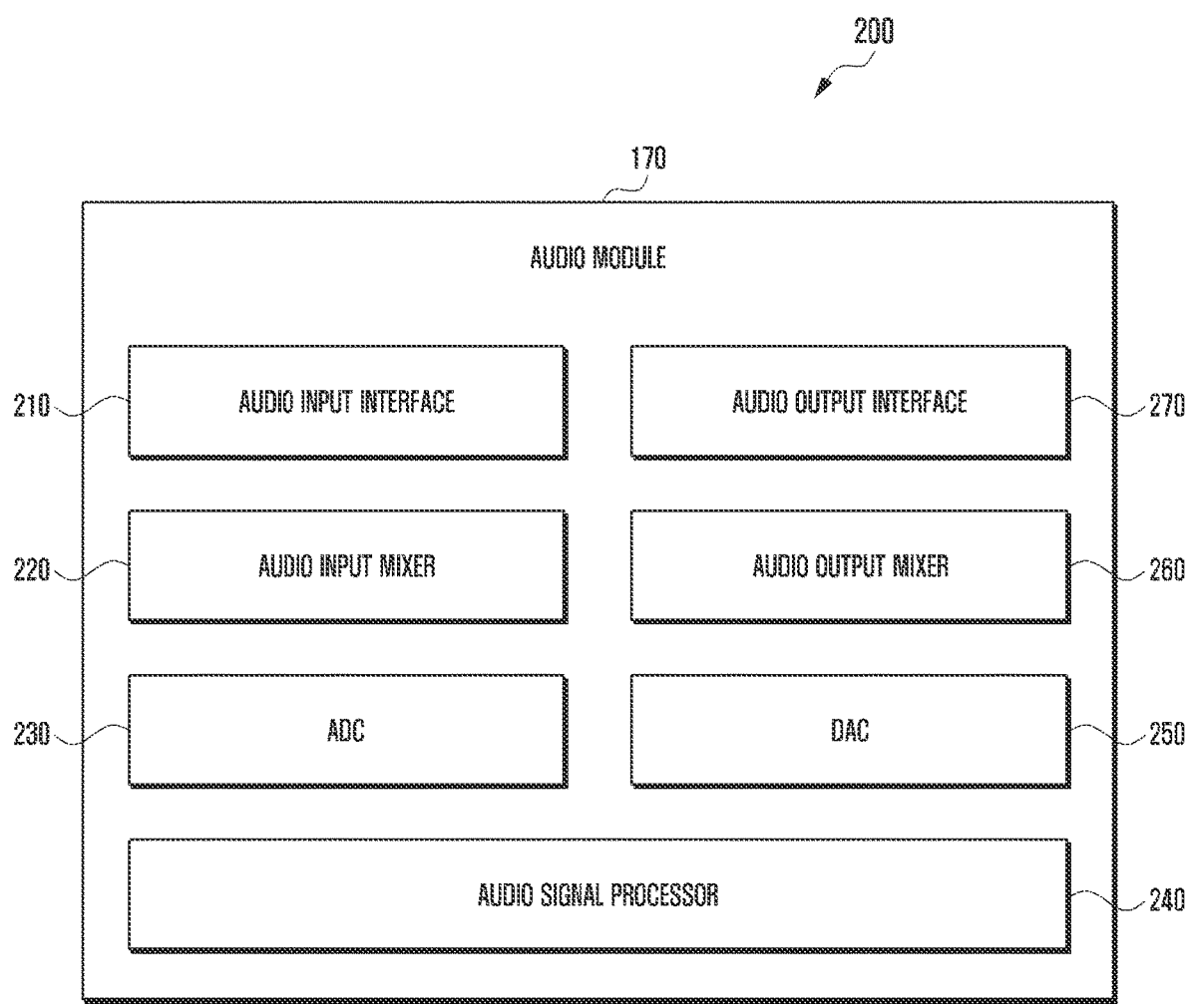
FIG. 2 is a block diagram illustrating an audio module according to an embodiment of the disclosure.

FIG. 2 is a block diagram illustrating the audio module according to an embodiment of the disclosure.

Referring to FIG. 2, in a block diagram 200, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
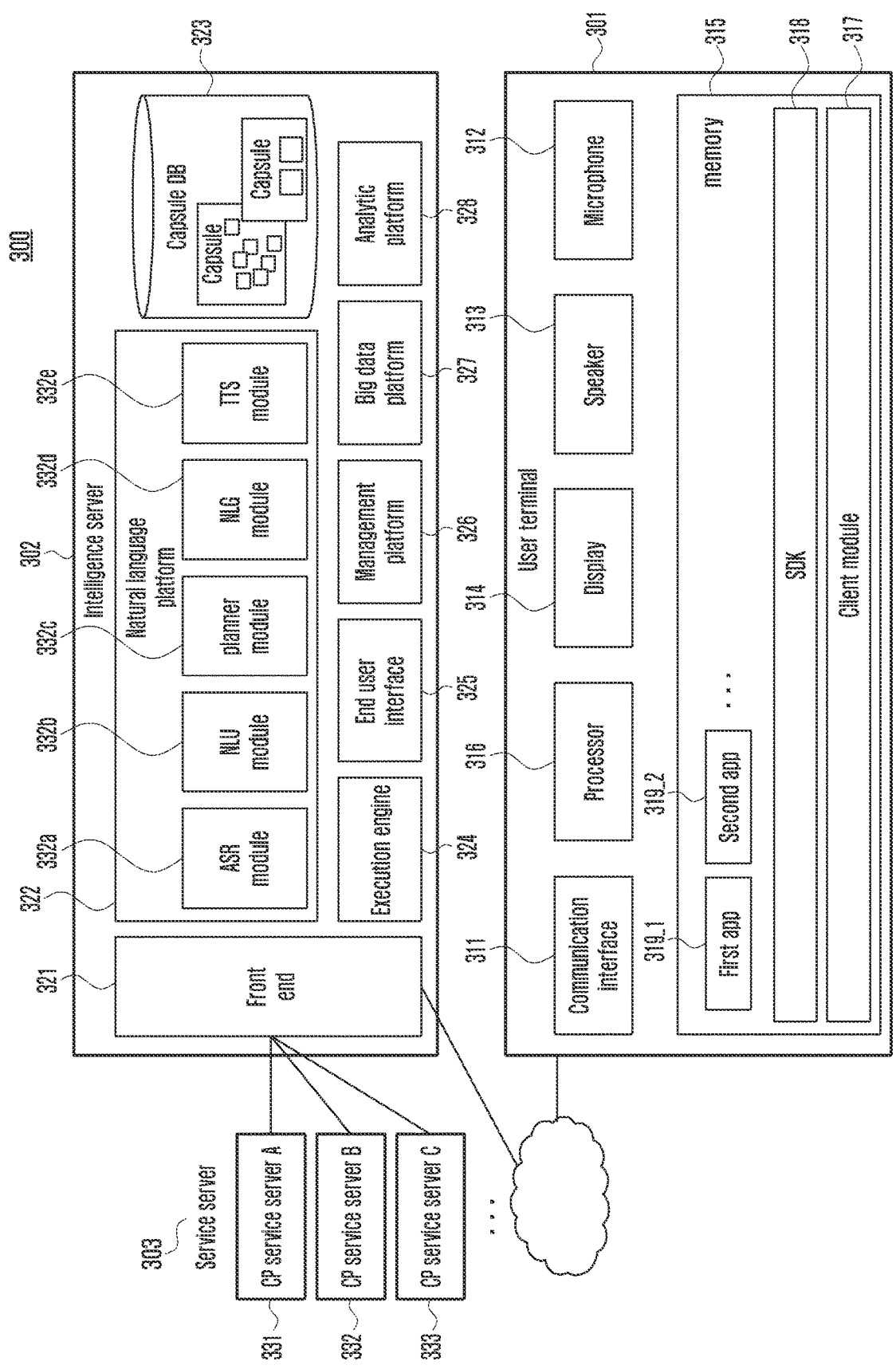
FIG. 3 is a block diagram illustrating an integrated intelligence system according to an embodiment of the disclosure.

FIG. 3 is a block diagram illustrating an integrated intelligence system according to an embodiment of the disclosure.

Referring to FIG. 3, the integrated intelligence system 300 according to an embodiment may include a user terminal 301, an intelligent (or intelligence) server 302, and a service server 303.

According to an embodiment, the user terminal 301 may be a terminal device (or electronic device) that can be connected to the Internet, for example, a mobile phone, a smartphone, a personal digital assistant (PDA), a notebook computer, a TV, a domestic appliance, a wearable device, an HMD, or a smart speaker.

According to an embodiment, the user terminal 301 (e.g., the electronic device 101 of FIG. 1) may include a communication interface 311, a microphone 312, a speaker 313, a display 314, a memory 315, and a processor 316. The listed components may be operatively or electrically connected to each other.

According to an embodiment, the communication interface 311 may be configured to be connected to an external device to transmit and receive data. According to an embodiment, the microphone 312 may receive a sound (e.g., a user's utterance) and may convert the sound into an electrical signal. According to an embodiment, the speaker 313 may output an electrical signal as a sound (e.g., a voice). According to an embodiment, the display 314 may be configured to display an image or a video. According to an embodiment, the display 314 may display a graphic user interface (GUI) of an executed application (or application program).

According to an embodiment, the memory 315 may store a client module 317, a software development kit (SDK) 318, and a plurality of applications 319_1 and 319_2. The client module 317 and the SDK 318 may form a framework (or a solution program) for performing a general-purpose function. In addition, the client module 317 or the SDK 318 may form a framework for processing a voice input.

According to an embodiment, the plurality of applications 319_1 and 319_2 in the memory 315 may be programs for performing a designated function. According to an embodiment, the plurality of applications 319_1 and 319_2 may include a first application 319_1 and a second application 319_2. According to an embodiment, each of the plurality of applications 319_1 and 319_2 may include a plurality of operations for performing a designated function. For example, the plurality of applications 319_1 and 319_2 may include at least one of an alarm application, a message application, and a schedule application. According to an embodiment, the plurality of applications 319_1 and 319_2 may be executed by the processor 316 to sequentially execute at least some of the plurality of operations.

According to an embodiment, the processor 316 may control the overall operation of the user terminal 301. For example, the processor 316 may be electrically connected to the communication interface 311, the microphone 312, the speaker 313, the display 314, and the memory 315 to perform a designated operation.

According to an embodiment, the processor 316 may also execute a program stored in the memory 315 to perform a designated function. For example, the processor 316 may execute at least one of the client module 317 or the SDK 318 to perform the following operation for processing a voice input. The processor 316 may control the operation of the plurality of applications 319_1 and 319_2, for example, through the SDK 318. An operation to be described below as the operation of the client module 317 or the SDK 318 may be an operation by execution by the processor 316.

According to an embodiment, the client module 317 may receive a voice input. For example, the client module 317 may generate a voice signal corresponding to a user's utterance detected through the microphone 312. The client module 317 may transmit the received voice input to the intelligent server 302. According to an embodiment, the client module 317 may transmit state information about the user terminal 301, together with the received voice input, to the intelligent server 302. The state information may be, for example, execution state information about an application.

According to an embodiment, the client module 317 may receive a result corresponding to the received voice input. For example, the client module 317 may receive the result corresponding to the received voice input from the intelligent server 302. The client module 317 may display the received result on the display 314.

According to an embodiment, the client module 317 may receive a plan corresponding to the received voice input. The client module 317 may display a result of executing a plurality of operations of an application according to the plan on the display 314. For example, the client module 317 may sequentially display results of executing the plurality of operations on the display. In another example, the user terminal 301 may display only some (e.g., a result of executing the last operation) of the results of executing the plurality of operations on the display.

According to an embodiment, the client module 317 may receive a request for obtaining information required to produce the result corresponding to the voice input from the intelligent server 302. The information required to produce the result may be, for example, state information about an electronic device 101. According to an embodiment, the client module 317 may transmit the required information to the intelligent server 302 in response to the request.

According to an embodiment, the client module 317 may transmit information about the result of executing the plurality of operations according to the plan to the intelligent server 302. The intelligent server 302 may identify that the received voice input has been properly processed using the information about the result.

According to an embodiment, the client module 317 may include a voice recognition module. According to an embodiment, the client module 317 may recognize a voice input for performing a limited function through the voice recognition module. For example, the client module 317 may perform an intelligent application for processing a voice input for performing an organic operation through a designated input (e.g., Wake up!). The client module 317 may recognize a call utterance (e.g., Hi Bixby) in an audio signal received from the microphone 312 and may start an AI agent service in response to the call utterance.

According to an embodiment, the intelligent server 302 (e.g., the server 108 of FIG. 1) may receive information relating to a user voice input from the user terminal 301 through a communication network. According to an embodiment, the intelligent server 302 may change data relating to the received voice input into text data. According to an embodiment, the intelligent server 302 may generate, based on the text data, a plan for performing a task corresponding to the user voice input.

According to an embodiment, the plan may be generated by an artificial intelligence (AI) system. The artificial intelligence system may be a rule-based system or a neural network-based system (e.g., a feedforward neural network (FNN)), or a recurrent neural network (RNN). Alternatively, the artificial intelligence system may be a combination of the above systems or a different artificial intelligence system. According to an embodiment, the plan may be selected from a set of predefined plans, or may be generated in real time in response to a user request. For example, the artificial intelligence system may select at least one plan from among a plurality of predefined plans.

According to an embodiment, the intelligent server 302 may transmit a result obtained according to the generated plan to the user terminal 301 or may transmit the generated plan to the user terminal 301. According to an embodiment, the user terminal 301 may display the result obtained according to the plan on the display 314. According to an embodiment, the user terminal 301 may display a result of executing an operation according to the plan on the display.

According to an embodiment, the intelligent server 302 may include a front end 321, a natural language platform 322, a capsule database (DB) 323, an execution engine 324, an end user interface 325, a management platform 326, a big data platform 327, and an analytic platform 328.

According to an embodiment, the front end 321 may receive a voice input received from the user terminal 301. The front end 321 may transmit a response corresponding to the voice input.

According to an embodiment, the natural language platform 322 may include an automatic speech recognition module (ASR module) 322a, a natural language understanding module (NLU module) 322b, a planner module 322c, a natural language generator (or generation) module (NLG module) 322d, and a text-to-speech module (TTS module) 322e.

According to an embodiment, the ASR module 322a may convert a voice input received from the user terminal 301 into text data.

According to an embodiment, the NLU module 322b may understand a user's intent using the text data of the voice input. For example, the NLU module 322b may understand the user's intent by performing a syntactic analysis or a semantic analysis. According to an embodiment, the NLU module 322b may understand the meaning of a word extracted from the voice input using a linguistic feature (e.g., a syntactic element) of a morpheme or phrase and may determine the user's intent by matching the understood meaning of the word to intent.

According to an embodiment, the planner module 322c may generate a plan using the intent determined by the NLU module 322b and a parameter. According to an embodiment, the planner module 322c may determine a plurality of domains necessary to perform a task based on the determined intent. The planner module 322c may determine a plurality of operations respectively included in the plurality of domains determined based on the intent. According to an embodiment, the planner module 322c may determine a parameter required to execute the plurality of determined operations or a result value output by executing the plurality of operations. The parameter and the result value may be defined as a concept related to a designated format (or class). Accordingly, the plan may include the plurality of operations determined by the intent of the user and a plurality of concepts. The planner module 322c may determine a relationship between the plurality of operations and the plurality of concepts by stages (or hierarchically). For example, the planner module 322c may determine the execution order of the plurality of operations, determined based on the user's intent, based on the plurality of concepts. That is, the planner module 322c may determine the execution order of the plurality of operations, based on the parameter required to execute the plurality of operations and the result output by executing the plurality of operations. Accordingly, the planner module 322c may generate a plan including association information (e.g., ontology) between the plurality of operations and the plurality of concepts. The planner module 322c may generate a plan using information stored in a capsule DB 323 in which a set of relationships between concepts and operations is stored.

According to an embodiment, the NLG module 322d may change designated information into a text form. The information changed into the text form may be in the form of a natural language utterance.

According to an embodiment, the TTS module 322e may change information in the text form into information in a voice form.

According to an embodiment, the capsule DB 323 may store information about a relationship between a plurality of concepts and a plurality of operations corresponding to a plurality of domains. For example, the capsule DB 323 may store a plurality of capsules including a plurality of action objects (or pieces of action information) and a plurality of concept objects (or pieces of concept information) of a plan. According to an embodiment, the capsule DB 323 may store the plurality of capsules in the form of a concept action network (CAN). According to an embodiment, the plurality of capsules may be stored in a function registry included in the capsule DB 323.

According to an embodiment, the capsule DB 323 may include a strategy registry that stores strategy information required to determine a plan corresponding to a voice input. The strategy information may include reference information for determining one plan when there is a plurality of plans corresponding to the voice input. According to an embodiment, the capsule DB 323 may include a follow-up registry that stores information about a follow-up for suggesting a follow-up to the user in a specified situation. The follow-up may include, for example, a following utterance. According to an embodiment, the capsule DB 323 may include a layout registry that stores layout information about information output through the user terminal 301. According to an embodiment, the capsule DB 323 may include a vocabulary registry that stores vocabulary information included in capsule information. According to an embodiment, the capsule DB 323 may include a dialog registry that stores information about a dialog (or interaction) with the user.

According to an embodiment, the capsule DB 323 may update a stored object through a developer tool. The developer tool may include, for example, a function editor for updating an action object or a concept object. The developer tool may include a vocabulary editor for updating vocabulary. The developer tool may include a strategy editor for generating and registering a strategy for determining a plan. The developer tool may include a dialog editor that generates a dialog with the user. The developer tool may include a follow-up editor capable of activating a following target and editing a following utterance providing a hint. The following target may be determined based on a currently set target, user preference, or an environmental condition.

According to an embodiment, the capsule DB 323 can also be implemented in the user terminal 301. That is, the user terminal 301 may include the capsule DB 323 that stores information for determining an operation corresponding to a voice input.

According to an embodiment, the execution engine 324 may produce a result using the generated plan. According to an embodiment, the end user interface 325 may transmit the produced result to the user terminal 301. Accordingly, the user terminal 301 may receive the result and may provide the received result to the user. According to an embodiment, the management platform 326 may manage information used in the intelligent server 302. According to an embodiment, the big data platform 327 may collect user data. According to an embodiment, the analytic platform 328 may manage the quality of service (QoS) of the intelligent server 302. For example, the analytic platform 328 may manage a component and the processing speed (or efficiency) of the intelligent server 302.

According to an embodiment, the service server 303 may provide a designated service (e.g., a food delivery service or a hotel reservation service) to the user terminal 301. According to an embodiment, the service server 303 may be a server operated by a third party. For example, the service server 303 may include a first service server 331, a second service server 332, and a third service server 333 that are operated by different third parties. According to an embodiment, the service server 303 may provide information for generating a plan corresponding to a received voice input to the intelligent server 302. The provided information may be stored, for example, in the capsule DB 323. In addition, the service server 303 may provide result information according to the plan to the intelligent server 302.

In the foregoing integrated intelligent system 300, the user terminal 301 may provide various intelligent services to the user in response to a user input. The user input may include, for example, an input through a physical button, a touch input, or a voice input.

In an embodiment, the user terminal 301 may provide a voice recognition service through an intelligent application (or voice recognition application) stored therein. In this case, for example, the user terminal 301 may recognize a user utterance or a voice input received through the microphone and may provide a service corresponding to the recognized voice input to the user.

In an embodiment, the user terminal 301 may perform a designated operation alone or together with the intelligent server 302 and/or the service server 303, based on the received voice input. For example, the user terminal 301 may execute an application corresponding to the received voice input and may perform the designated operation through the executed application.

In an embodiment, when the user terminal 301 provides a service together with the intelligent server 302 and/or the service server 303, the user terminal 301 may detect a user utterance using the microphone 312 and may generate a signal (or voice data) corresponding to the detected user speech. The user terminal 301 may transmit the voice data to the intelligent server 302 using the communication interface 311.

According to an embodiment, the intelligent server 302 may generate, as a response to voice input received from the user terminal 301, a plan for performing a task corresponding to the voice input or a result of performing an operation according to the plan. The plan may include, for example, a plurality of operations for performing the task corresponding to the user's voice input and a plurality of concepts related to the plurality of operations. The concepts may define a parameter input to execute the plurality of operations or a result value output by executing the plurality of operations. The plan may include information about an association between the plurality of operations and the plurality of concepts.

According to an embodiment, the user terminal 301 may receive the response using the communication interface 311. The user terminal 301 may output an audio signal generated inside the user terminal 301 to the outside using the speaker 313 or may output an image generated inside the user terminal 301 to the outside using the display 314.

Figure 4:
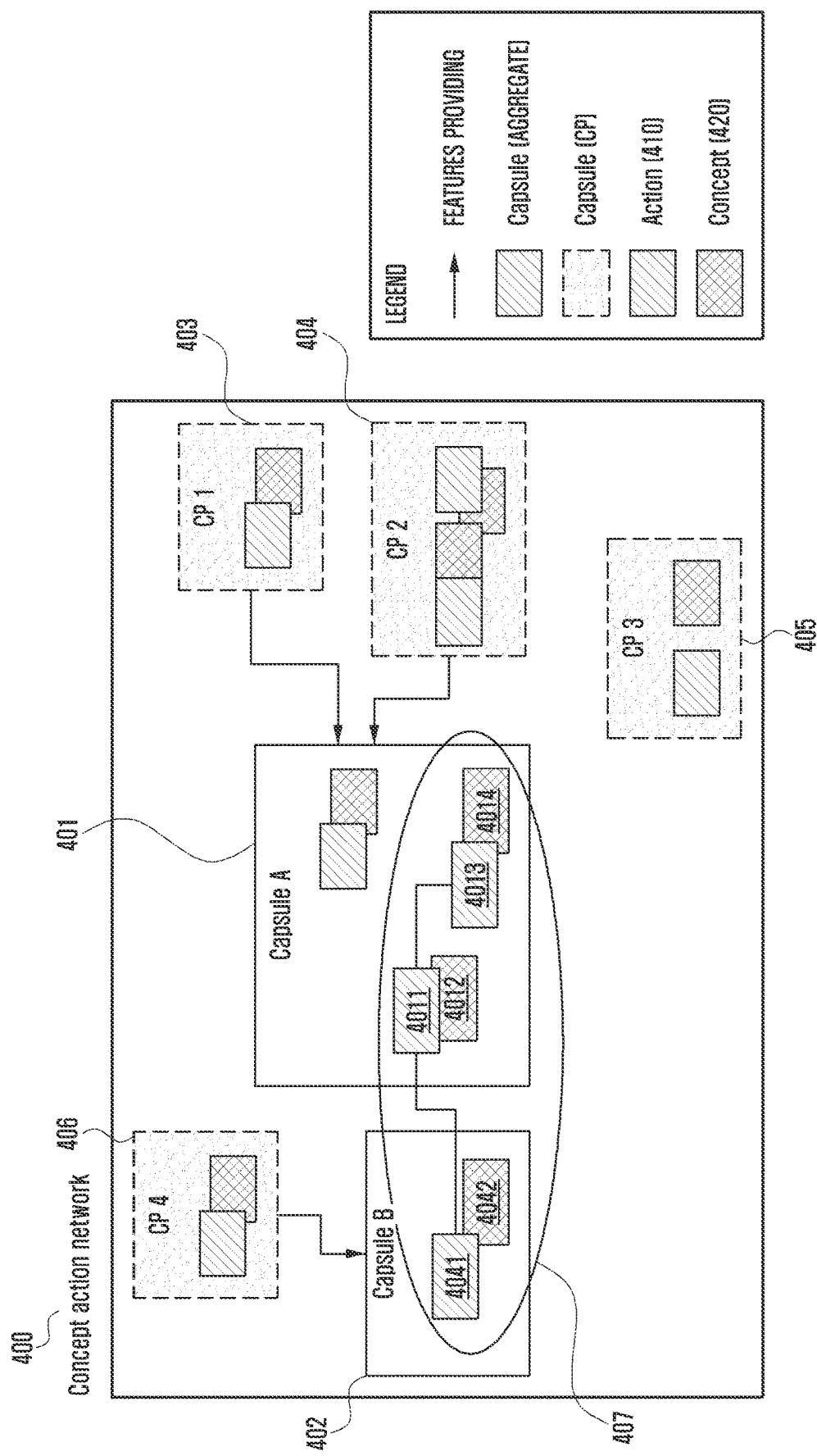
FIG. 4 illustrates a form in which information about a relationship between a concept and an action is stored in a database according to an embodiment of the disclosure.

FIG. 4 illustrates a form in which information about a relationship between a concept and an action is stored in a database according to an embodiment of the disclosure.

Referring to FIG. 4, a capsule DB (e.g., the capsule database DB 323) of the intelligent server 302 may store a capsule in the form of a concept action network (CAN) 400. The capsule DB may store an operation of processing a task corresponding to a voice input from a user and a parameter required for the operation in the form of a concept action network (CAN). The CAN may show a systematic relationship between an action and a concept defining a parameter required to perform the action.

The capsule DB may store a plurality of capsules (e.g., capsule A 401 and capsule B 402) respectively corresponding to a plurality of domains (e.g., applications). According to an embodiment, one capsule (e.g., capsule A 401) may correspond to one domain (e.g., application). Further, one capsule may correspond to at least one service provider (e.g., CP 1 403, CP 2 404, CP 3 405, or CP 4 406) for performing a function for a domain related to the capsule. According to an embodiment, one capsule may include at least one action 410 and at least one concept 420 for performing a specified function.

According to an embodiment, the natural language platform 322 may generate a plan for performing a task corresponding to a received voice input using a capsule stored in the capsule DB. For example, the planner module 322c of the natural language platform 322 may generate the plan using the capsule stored in the capsule DB. For example, the planner module 322c may generate a plan 407 using actions 4011 and 4013 and concepts 4012 and 4014 of capsule A 401 and an action 4041 and a concept 4042 of capsule B 402.

Figure 5:
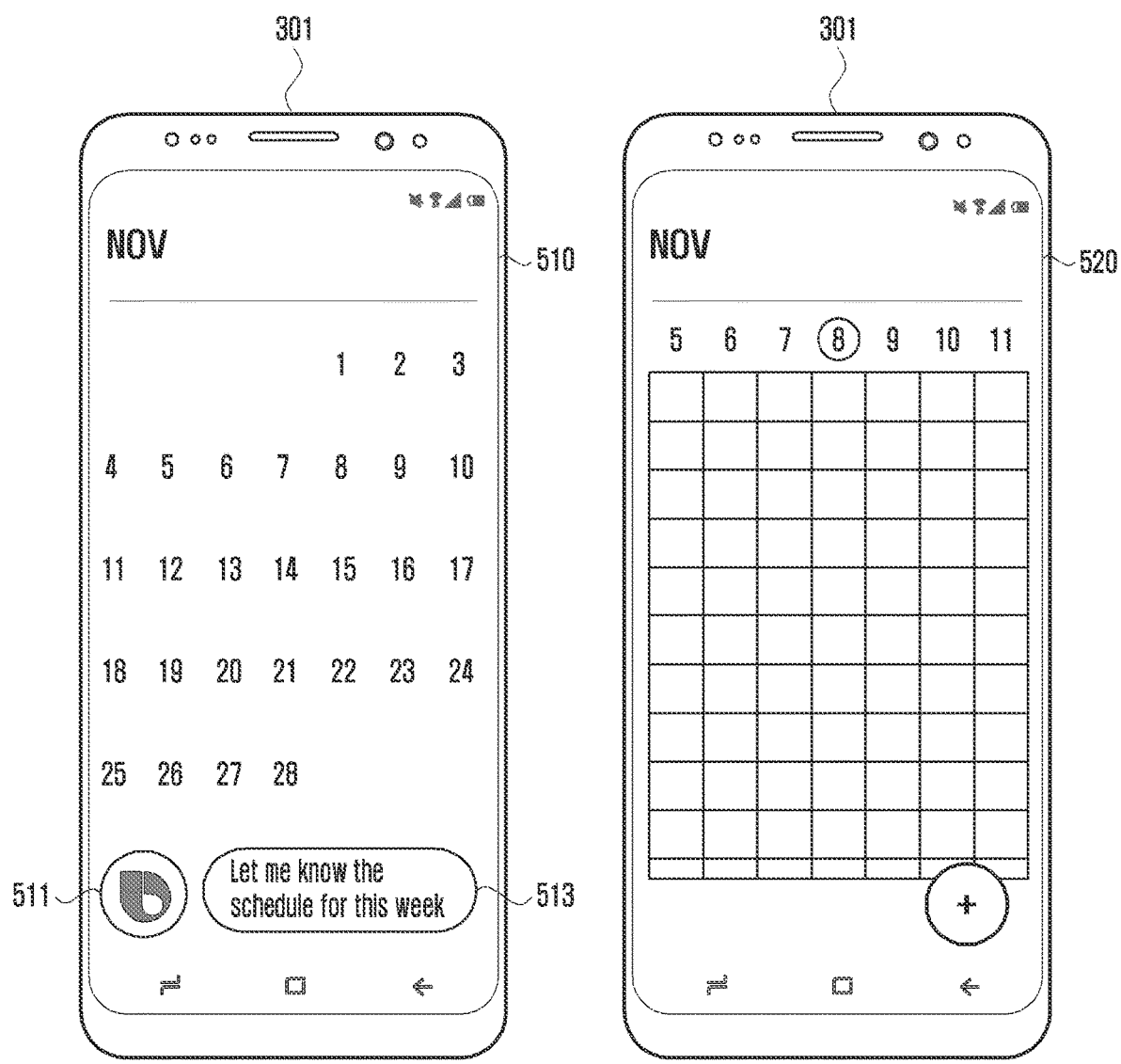
FIG. 5 illustrates a screen for a user terminal to process a received voice input through an intelligent application according to an embodiment of the disclosure.

FIG. 5 illustrates a screen for a user terminal to process a received voice input through an intelligent application according to an embodiment of the disclosure.

Referring to FIG. 5, the user terminal 301 may execute an intelligent application to process a user input through the intelligent server 302.

According to an embodiment, when recognizing a designated voice input (e.g., Wake up!) or receiving an input via a hardware key (e.g., a dedicated hardware key), the user terminal 301 may execute the intelligent application for processing the voice input on screen 510. For example, the user terminal 301 may execute the intelligent application in a state in which a schedule application is executed. According to an embodiment, the user terminal 301 may display an object (e.g., an icon) 511 corresponding to the intelligent application on the display 314. According to an embodiment, the user terminal 301 may receive a voice input based on a user utterance. For example, the user terminal 301 may receive a voice input "Tell me the schedule for this week!" According to an embodiment, the user terminal 301 may display a user interface (UI, e.g., an input window) 513 of the intelligent application displaying text data of the received voice input on the display.

According to an embodiment, the user terminal 301 may display a result corresponding to the received voice input on screen 520 on the display. For example, the user terminal 301 may receive a plan corresponding to the received user input and may display "Schedule for this week" according to the plan on the display.

Figure 6:
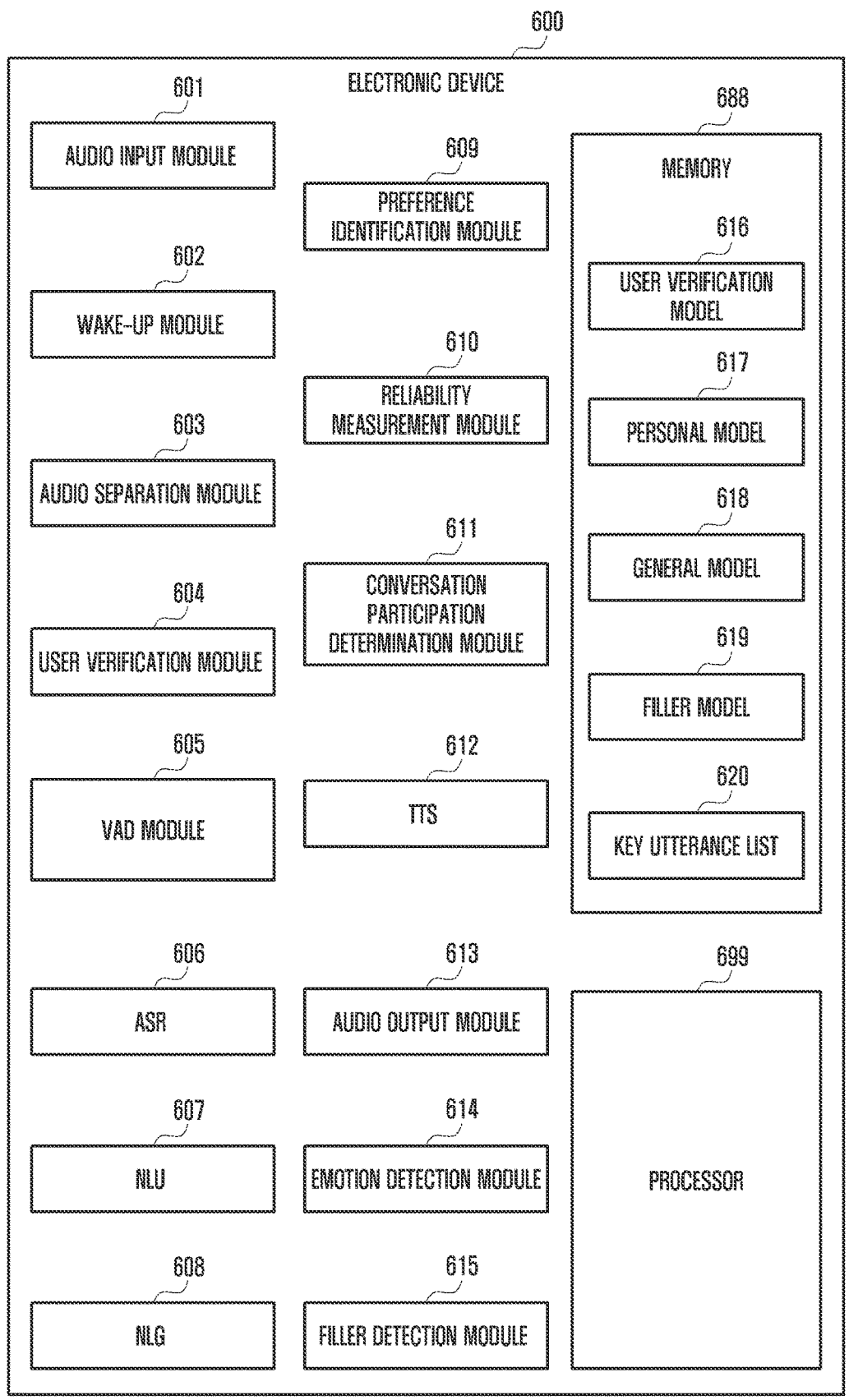
FIG. 6 is a block diagram of an electronic device configured to enable an AI agent to participate in a conversation between a user and a neighbor according to an embodiment of the disclosure.

FIG. 6 is a block diagram of an electronic device configured to enable an AI agent to participate in a conversation between a user and a neighbor according to an embodiment of the disclosure.

Figure 7:
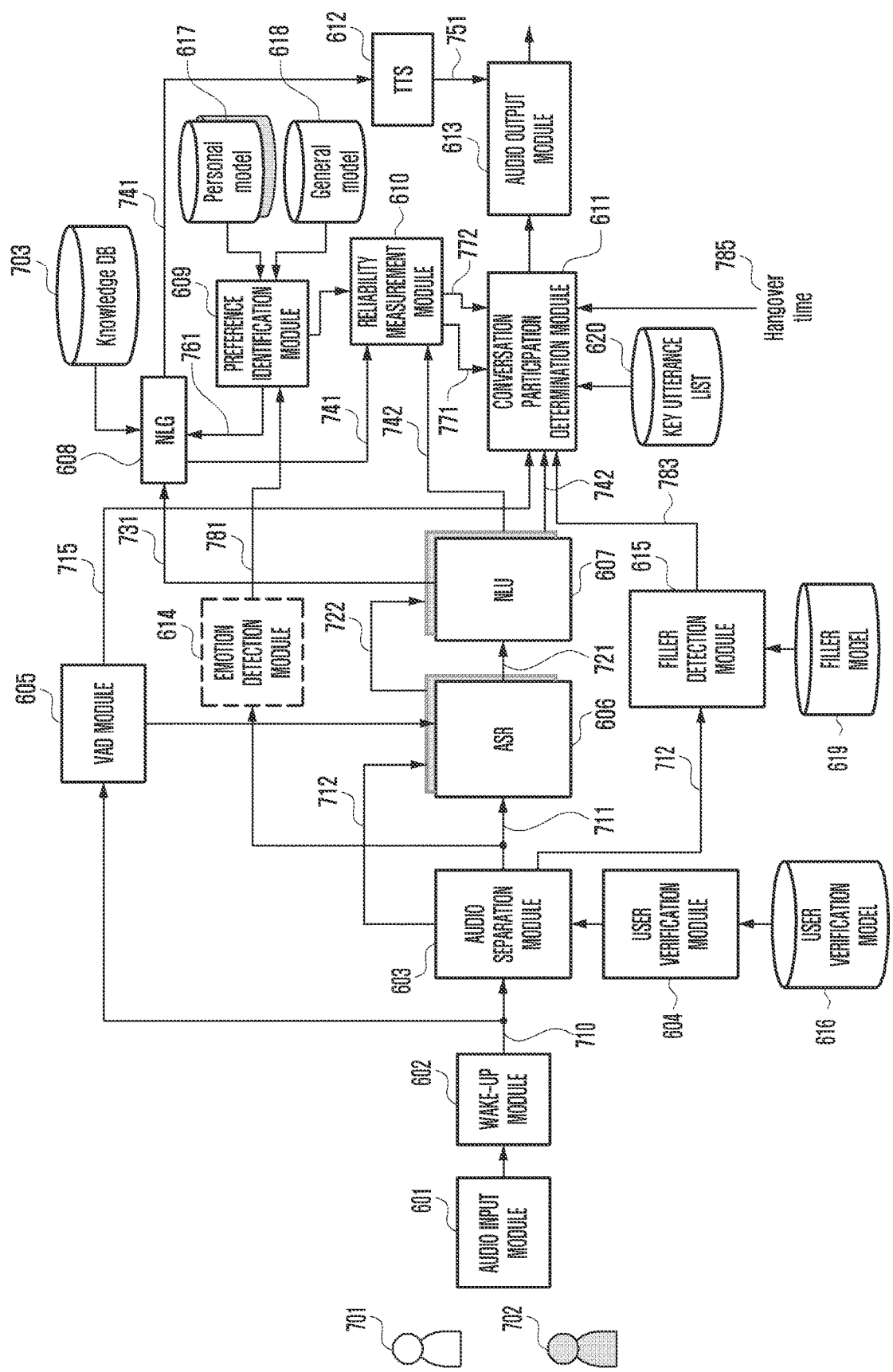
FIG. 7 illustrates connections between modules of FIG. 6 according to an embodiment of the disclosure.

FIG. 7 illustrates connections between modules of FIG. 6 according to an embodiment of the disclosure.

Referring to FIGS. 6 and 7, the electronic device 600 (e.g., the electronic device 101 of FIG. 1) may include an audio input module 601, a wake-up module 602, an audio separation module 603, a user verification module 604, a voice activity detection (VAD) module 605, an ASR 606, an NLU 607, an NLG 608, a preference identification module 609, a reliability measurement module 610, a conversation participation determination module 611, a TTS 612, an audio output module 613, an emotion detection module 614, a filler detection module 615, a user verification model 616, a personal model 617, a general model 618, a filler model 619, a key utterance list 620, a memory 688, or a processor 699. The foregoing components of the electronic device 600 may be operatively or electrically connected to each other. The models 617 to 619 and the key utterance list 620 may be stored in the memory 688. According to an embodiment, the modules 601 to 615 may be operatively connected as shown in FIG. 7.

The audio input module 601 may receive an audio signal. For example, the audio input module 601 may receive an audio signal from a microphone configured in the input module 150 of FIG. 1. The audio input module 601 may receive an audio signal from an external device (e.g., a headset or a microphone) connected via a cable through an audio connector configured in the connection terminal 178 of FIG. 1. The audio input module 601 may receive an audio signal from an external device wirelessly (e.g., via Bluetooth communication) connected to the electronic device 600 through a wireless communication circuit (e.g., the wireless communication module 192 of FIG. 1).

The wake-up module 602 may recognize that a user 701 calls an AI agent (or voice assistant).

According to an embodiment, the wake-up module 602 may receive an audio signal from the audio input module 601 and may recognize an utterance (e.g., Hi Bixby) designated to call the AI agent in the received audio signal. For example, the wake-up module 602 may detect the starting point and the end point of the user utterance in the audio signal, thereby obtaining a part including the user utterance (e.g., a first part corresponding to "High" and a second part corresponding to "Bixby") in the audio signal. The wake-up module 602 may compare the obtained utterance part with voice data previously stored, thereby determining whether the audio signal includes a call utterance (or a driving utterance).

According to an embodiment, the wake-up module 602 may support the user 701 to call the AI agent using a method other than a voice. For example, the wake-up module 602 may recognize two consecutive presses of a power key of the input module 150 as a call. In another example, the wake-up module 602 may recognize a touch input received from a touch circuit of the display module 160 as a call.

The audio separation module 603 may separate an audio signal 710 received from the audio input module 601 through the wake-up module 602 into a user audio signal 711 including a voice of the user 701 and a neighbor audio signal 712 including a voice of a neighbor 702 having a conversation with the user 701 in response to a call from the user 701.

According to an embodiment, the audio separation module 603 may obtain the user audio signal 711 and the neighbor audio signal 712 using the user verification model 616. The user verification model 616 finds a user voice to which an AI agent needs to respond in an audio signal and may be, for example, an artificial intelligence model trained using utterance data of the user 701 (e.g., a call utterance of the user 701 recognized in a user registration process). For example, the audio separation module 603 may enter the audio signal 710 as an input value into the user verification model 616 through the user verification module 604 by a unit of a frame (e.g., 20 ms) and may determine whether an audio frame entered as the input value includes the voice of the user, based on a result value output from the user verification model 616. For example, when the result value indicates that the audio frame includes the user voice, the audio separation module 603 may classify the audio frame as the user audio signal 711. When the result value indicates that the audio frame does not include the voice of the user, the audio separation module 603 may classify the audio frame as the neighbor audio signal 712.

The voice activity detection (VAD) module 605 may recognize a speech section 715 in the audio signal 710 received from the audio input module 601 through the wake-up module 602. For example, the audio signal 710 may be transmitted to the audio separation module 603, and a copy thereof may be transmitted to the VAD module 605 to be used for voice activity detection.

According to an embodiment, the VAD module 605 may recognize the speech section in the audio signal 710 using a VAD model (e.g., a convolutional neural network (CNN) model or a recurrent neural network (RNN) model) trained using an artificial intelligence algorithm. For example, the VAD module 605 may enter the audio signal 710 as an input value into the VAD model by a unit of a frame and may obtain a result value from the VAD model. For example, the result value may include a predictive value indicating whether an input audio frame is a voice frame. When an audio frame input to the VAD model is a voice frame, the VAD module 605 may recognize whether the voice frame is the start point of a speech section, the end point thereof, or within the speech section, based on predictive values output from the VAD model. For example, a first audio frame, a second audio frame, and a third audio frame may be sequentially input to the VAD model, and a first predictive value, a second predictive value, and a third predictive value may be sequentially output from the VAD model. When the first predictive value indicates that no voice is present in the first audio frame, the second predictive value indicates that a voice is present in the second audio frame, and the third predictive value indicates that a voice is present in the third audio frame, the VAD module 605 may recognize the second audio frame as the start point of a speech section and may recognize the third audio frame as a frame within the speech section. When the first predictive value indicates that a voice is present in the first audio frame and the second predictive value indicates that no voice is present in the second audio frame, the VAD module 605 may recognize the second audio frame as the end point of a speech section.

The ASR 606 (e.g., the automatic speech recognition module 322a of FIG. 3) may convert a user voice in a speech section recognized by the VAD module 605 in the user audio signal 711 received through the audio separation module 603 into user text data 721. The ASR 606 may convert a neighbor voice in a speech section recognized by the VAD module 605 in the neighbor audio signal 712 received through the audio separation module 603 into neighbor text data 722.

The NLU 607 (e.g., the natural language understanding module 322b of FIG. 3) may understand the intent of the user 701 using the user text data 721 received from the ASR 606. For example, the NLU 607 may understand what information the user 701 has queried or requested. The NLU 607 may understand what function or service the user 701 has given a command to execute. The NLU 607 may understand the intent of the neighbor 702 using the neighbor text data 722 received from the ASR 606. For example, the NLU 607 may recognize that a neighbor utterance is an answer to a query or request from the user 701.

According to an embodiment, a mode in which the AI agent responds to a call from the user 701 may include a one-time conversation mode and a continuous conversation mode. For example, the one-time conversation mode may be a mode in which the AI agent responds to a query or command of the user 701 after a user call and ends a conversation, or ends the conversation when there is no additional query or command within a specified time after the response. The continuous conversation mode may be a mode in which the AI agent continuously participates in a conversation between the user 701 and the neighbor 702 after a user call, and ends the participation in the conversation when an end utterance of the user 701 is recognized.

According to an embodiment, the NLU 607 may determine whether a response mode is the one-time conversation mode or the continuous conversation mode, based on user intent understood from user voice data. For example, after giving a call utterance of "Hi Bixby" or entering a call key, the NLU 607 may understand a command of the user 701 as starting the continuous conversation mode from user voice data received from the ASR 606, such as "Start the conversation mode" or "Join our conversation," and may determine the response mode as the continuous conversation mode. As the response mode is determined as the continuous conversation mode, a component (e.g., the modules 603 to 615) for supporting an AI agent service may be continuously activated. In a state in which the continuous conversation mode is maintained, the NLU 607 may understand a command of the user 701 as ending the continuous conversation mode from user voice data received from the ASR 606, such as "End the conversation mode," "Stop now," or "Hi Bixby, stop," and may determine to end the continuous conversation mode. As the end of the continuous conversation mode is determined, the component for supporting the AI agent service may be continuously deactivated.

The NLG 608 (e.g., the natural language generation module 322d of FIG. 3) may generate an answer (i.e., an agent answer) 741 of the AI agent, based on the user intent 731 understood by the NLU 607. The answer of the agent may be displayed on a display or may be converted into a voice signal 751 by the TTS 612.

According to an embodiment, the NLG 608 may generate an agent answer indicating that the AI agent has understood what the user command is. For example, as the NLU 607 understands the command of the user as starting the continuous conversation mode, the NLG 608 may generate an agent answer "The conversation mode is started." As the NLU 607 understands the command of the user as ending the continuous conversation mode, the NLG 608 may generate an agent response "The conversation mode is terminated." As the NLU 607 understands a user utterance (e.g., Are you listening?) as identifying that the conversation mode is continuing, the NLG 608 may generate an agent response "Yes, I am listening."

According to an embodiment, the NLG 608 may generate an agent answer to a query or request of the user 701, based on a knowledge database (e.g., a database configured in the server 108 of FIG. 1). For example, the NLG 608 may retrieve information queried or requested by user 701, which is understood by NLU 607, from the knowledge database 703 and may generate the answer 741 of the agent, based on the information retrieved from the knowledge database.

According to an embodiment, the NLG 608 may identify a preference 761 of the user 701 for information retrieved according to a query or request of the user 701 through the preference identification module 609 and may generate an agent answer, based on preference information. For example, the NLG 608 may select information to be provided for the user 701 among information (e.g., a list of recommended movies) retrieved from the knowledge database, based on the preference 761 identified through the preference identification module 609 and may generate the answer 741 of the agent using the selected information.

According to an embodiment, the NLG 608 may determine whether a neighbor answer 742 understood by the NLU 607 is right or wrong, based on the knowledge database, and may generate the answer 741 of the AI agent, based on the determination. For example, when the neighbor 702 answers "He is the third king of the Joseon Dynasty" to a user question "What number king is King Sejong?," the NLG 608 may recognize that the neighbor answer understood by the NLU 607 includes wrong information, based on the knowledge database, and may generate an agent answer "No. King Sejong is the fourth king of the Joseon Dynasty" by correcting the answer of the neighbor.

The preference identification module 609 may identify a preference of the user 701 for information obtained by the NLG 608, based on the personal model 617 and/or the general model 618.

According to an embodiment, the personal model (or personal preference model) 617 may be an artificial intelligence model that is learned using an artificial intelligence algorithm and is personalized in relation to a preference of the user 701. For example, the personal model 617 may collect a user profile associated with an account used when the user 701 logs in to the electronic device 600. The collected user profile is, for example, a name, an age, a gender, an occupation, a home address, a company address, usage records (e.g., used content, usage time, and frequency of use) of applications installed in the electronic device 600, a record of a visit to a specific place (e.g., the location of a visited place and a stay time), and an Internet usage record (e.g., information about a visited site, a visit time, and a search term). When the collected user profile is entered as an input value, the personal model 617 may output a preference indicating how much the user likes each target as a predictive value. For example, the personal model 617 may out a preference of the user 701 for each application, a preference of the user 701 for each service, or a preference of the user 701 for each piece of content (e.g., movie, music, food, and sports) as a predictive value. According to an embodiment, the general model (or general preference model) 618 may be an artificial intelligence model for outputting a common preference of a plurality of unspecified persons as a predictive value. For example, the general model 618 may predict a preference (e.g., an application preference, a service preference, and a content preference) by age group and/or gender using profiles collected from the plurality of unspecified persons and may provide the preference to the preference identification module 609. The NLG 608 may generate an agent answer, based on the preference identified through the preference identification module 609. For example, when a user request understood by the NLU 607 is a movie recommendation, the NLG 608 may identify which genre of movie the user 701 prefers the most in the personal model 617 through the preference identification module 609. The NLG 608 may identify a movie that is the most popular in the age group of the user 701, a movie having a good rating, or a movie that a largest number of viewers have watched currently in the general model 618 through the preference identification module 609. The NLG 608 may generate an agent answer, based on identified preference information. For example, the NLG 608 may generate "How about the movie OO?" as an agent answer, based on the user's personal preference information identified in the personal model 617. The NLG 608 may generate "The movie XX is the most popular," "The movie YY has a good rating," or "The movie ZZ is currently ranked first" as an agent answer, based on general preference information identified in the general model 618.

The reliability measurement module 610 may measure the first reliability 771 of the neighbor answer 742 understood by the NLU 607, provided to the user 701 in response to the user utterance, based on the preference 761 identified through the preference identification module 609. The reliability measurement module 610 may measure the second reliability 772 of the agent answer 741 provided by the NLG 608 in response to the user utterance, based on the preference 761 identified through the preference identification module 609. For example, a user request may be understood as a movie recommendation by the NLU 607, and a genre may be understood from the title of a first movie included in a neighbor answer. The reliability measurement module 610 may identify how much the user 701 likes the genre of the first movie in the answer of the neighbor 702 through the preference identification module 609 and may give a reliability to the neighbor answer, based on identified preference (e.g., in proportion to the preference). When it is understood by the NLU 607 that there is no movie-related word in the neighbor answer, the reliability measurement module 610 may give the lowest reliability to the neighbor answer. The reliability measurement module 610 may identify how much the user 701 likes the genre of a second movie in an agent answer generated by the NLG 608 through the preference identification module 609 and may give a reliability to the agent answer, based on identified preference (e.g., in proportion to the preference).

The conversation participation determination module 611 may determine whether the agent responds, based on the measured reliabilities 771 and 772. For example, in response to the user 701's query "What kind of movie do you want to see?" a neighbor answer may be "How about the movie OO?" and an answer provided by the AI agent may be "How about the movie XX?" In another example, in response to the user 701's query "Recommend a nice restaurant nearby," a neighbor answer may be "Only the restaurant OO comes to my mind," and an answer provided by the AI agent may be "Recommended restaurants near Gangnam Station are aaa, bbb, and ccc." The reliability measurement module 610 may give a first reliability to the neighbor answer and a second reliability to the answer of the agent, based on preference identified through the preference identification module 609. When the second reliability given to the agent answer is higher than the first reliability given to the neighbor answer or the two reliabilities are the same, the conversation participation determination module 611 may determine to provide the agent answer to the user 701. When the second reliability is lower than the first reliability, the conversation participation determination module 611 may determine not to provide the agent answer to the user 701.

The conversation participation determination module 611 may determine to participate in the conversation between the user 701 and the neighbor 702 when there is a positive response to a recommendation of the agent in the conversation. For example, as described above, the user 701 may positively react, for example, "I think the restaurant bbb will be okay?" to the agent answer "Recommended restaurants near Gangnam Station are aaa, bbb, and ccc," and the neighbor 702 may respond, for example, "Then let's go to the restaurant bbb," to the positive response of the user 701. The conversation participation determination module 611 may recognize a positive response in the conversation through NLU 607 and accordingly may determine to provide the agent answer 741, such as "May I guide you to the restaurant bbb?" prepared by the NLG 608 to the user 701.

When a neighbor answer includes wrong information and the NLG 608 prepares an agent answer correcting the wrong information, the conversation participation determination module 611 may determine to provide the agent answer to the user 701. For example, as described above, when there is wrong information in the neighbor answer "He is the third king of the Joseon Dynasty," the conversation participation determination module 611 may determine to provide the agent answer "No. King Sejong is the fourth king of the Joseon Dynasty" to the user 701 in order to correct the neighbor answer.

The conversation participation determination module 611 may determine a time to provide the agent answer 741, based on the VAD. For example, the conversation participation determination module 611 may recognize that a neighbor utterance has ended in response to a user utterance through the VAD module 605 and may determine the time to provide the agent answer 741 after a time of the recognition.

The TTS 612 (e.g., the text-to-speech module 322e of FIG. 3) may change information in a text form into a voice signal. For example, when participation in the conversation is determined by the conversation participation determination module 611, the TTS 612 may change the agent answer 741 generated by the NLG 608 into a voice signal 751.

The audio output module 613 may output the voice signal 751 received from the TTS 612. According to an embodiment, the audio output module 613 may output the answer (voice signal) of the agent received through the TTS 612 at a time determined by the conversation participation determination module 611. For example, the audio output module 613 may output the voice signal of the agent to a speaker configured in the sound output module 155 of FIG. 1. The audio output module 613 may output the voice signal of the agent to an external device (e.g., a headset or a speaker) connected via a cable through an audio connector configured in the connection terminal 178 of FIG. 1. The audio output module 613 may output the voice signal of the agent to an external device wirelessly (e.g., via Bluetooth communication) connected to the electronic device 600 through a wireless communication circuit (e.g., the wireless communication module 192 of FIG. 1).

The emotion detection module 614 may recognize a voice signal indicating a user emotion (or user response) to the answer of the agent from the user audio signal 711 received from the audio input module 601 through the audio separation module 603. The recognized user emotion may be used as a measure of how reliable the answer of the agent is. For example, the emotion detection module 614 may recognize a voice signal indicating a positive or negative response of the user 701 to the answer of the agent, based on characteristics (e.g., strength, pitch, and tone) of the user audio signal. The emotion detection module 614 may recognize a user emotion, based on the user text data received from the ASR 606. For example, the emotion detection module 614 may recognize that a word (e.g., oh, good, or okay) expressing a positive response exist in the user text data received from the ASR 606 and accordingly may recognize that the user emotion is positive about the answer of the agent. The emotion detection module 614 may recognize that a word (e.g., umm, ah, no, or I don't know) expressing a negative response exists in the user text data received from the ASR 606, and accordingly may recognize that the user emotion is negative about in the answer of the agent.

According to an embodiment, the preference identification module 609 may update the personal model 617 to be adapted to the user's taste, based on the user emotion 781 recognized by the emotion detection module 614. For example, in response to the user's query "What kind of movie do you want to see?" the user may show a negative response to an answer "How about the movie XX?" provided by the agent to the user, while the user 701 may show a positive response to an agent answer "How about the movie YY?" As the negative response of the user 701 to the movie XX is recognized by the emotion detection module 614, the preference identification module 609 may update the personal model 617 such that the preference of the user 701 for the genre of the movie XX is adjusted to be low. As the positive response of the user 701 to the movie YY is recognized by the emotion detection module 614, the preference identification module 609 may update the personal model 617 such that the preference of the user 701 for the genre of the movie YY is adjusted to be high. For example, the personal model 617 may be trained to be adaptive to the taste of the user 701 using emotion data of the user 701 received from the emotion detection module 614 through the preference identification module 609.

The filler detection module 615 may recognize a voice signal corresponding to a filler (e.g., uh, um, or ah) in the neighbor audio signal 712 received from the audio input module 601 through the audio separation module 603. The filler detection module 615 may recognize a filler from the neighbor text data 722 received from the ASR 606. The filler may be a word recognized as a situation in which the AI agent needs to participate in the conversation between the user and the neighbor. For example, the conversation participation determination module 611 may recognize that a filler is included in a neighbor answer through the filler detection module 615 and accordingly may determine to provide the answer 741 of the agent provided by the NLG 608 to the user 701. For example, when the neighbor 702 hesitates, saying "Um" in response to a user question "What are you going to do for dinner tonight?" the conversation participation determination module 611 may recognize a filler "Um" through the filler detection module 615 and accordingly may determine to provide an agent answer "How about shrimp pasta?" prepared by the NLG 608 to the user 701.

According to an embodiment, the filler detection module 615 may recognize the voice signal corresponding to the filler (e.g., uh, um, or ah) in the neighbor audio signal 712 using the filler model 619. For example, the filler model 619 may be an artificial intelligence model trained using filler training data. When the neighbor audio signal is entered as an input value, the filler model 619 may output a predictive value indicating whether a filler exists in the neighbor audio signal 712. The filler detection module 615 may output the predictive value 783 to the conversation participation determination module 611.

The key utterance list 620 may include utterance data designated as a situation in which an additional remark of the AI agent is required. According to an embodiment, when the neighbor answer 742 understood by the NLU 607 includes an utterance included in the key utterance list 620, the conversation participation determination module 611 may determine to provide the answer 741 of the agent prepared by the NLG 608 to the user 701. For example, when the neighbor 702 answers "I don't know. Should I ask Bixby?" to a user question "Will it rain in Seoul this weekend?" the conversation participation determination module 611 may recognize that the neighbor answer includes utterance data "I don't know" included in the key utterance list 620 and accordingly may determine to provide an agent answer "It is sunny today in Seoul" prepared by the NLG 608 to the user 701.

A reference time (e.g., hangover time) 785 for inducing participation of the AI agent in the conversation may be defined. According to an embodiment, the conversation participation determination module 611 may recognize through the NLU 607 and the VAD module 605 that a user utterance is a query requesting a neighbor answer and no neighbor utterance starts within a designated reference time after the user utterance ends. Accordingly, the conversation participation determination module 611 may determine to provide an agent answer prepared by the NLG 608 to the user 701. For example, an answer prepared by the agent to a query of the user 701 "What kind of movie do you want to see?" may be "How about the movie XX?" When the neighbor 702 does not answer, the AI agent may provide a prepared answer to the user 701. In another example, when the neighbor 702 does not answer to a query of the user 701 "Tell me the weather in Seoul today," the AI agent may provide an answer, for example, "It is sunny today in Seoul," prepared based on the knowledge database to the user 701.

The neighbor 702 having the conversation with the user 701 may also have a designated personal model, and the personal model of the neighbor 702 may be shared with the NLG 608 through the preference identification module 609. According to an embodiment, the NLG 608 may generate a plurality of agent answers using a plurality of personal models. For example, the NLG 608 may select information to be provided for the user 701 among the information (e.g., a list of recommended movies) retrieved from the knowledge database, based on a first preference identified from a first personal model (e.g., a user personal model) through the preference identification module 609 and may generate a first agent answer using the selected information. The NLG 608 may select information to be provided for the user 701, based on a second preference identified from a second personal model (e.g., a neighbor personal model) through the preference identification module 609 and may generate a second agent answer using the selected information. The reliability measurement module 610 may measure the first reliability of the first agent answer and the second reliability of the second agent answer, based on the first preference. In addition, the reliability measurement module 610 may measure the third reliability of a neighbor answer, based on the first preference. The conversation participation determination module 611 may identify an answer having the highest reliability among the measured reliabilities. As a result of identification, when the answer having the highest reliability is the first agent answer or the second agent answer, the conversation participation determination module 611 may determine to provide the corresponding agent answer to the user 701.

When there is no personal model 617 personalized to the user 701 or the personal model 617 does not include user information (e.g., information indicating a preference of the user 701 for content (e.g., movie) queried by the user 701), the general model 618 may be used to measure reliability. According to an embodiment, the general model 618 may collect information indicating preferences recorded by content users for each piece of content on an Internet site. For example, the general model 618 may collect ratings received by restaurant users on a delivery application or ratings received by viewers for released movies. The reliability measurement module 610 may measure the reliability of an agent answer and the reliability of a neighbor answer, based on information identified from the general model 618. For example, in response to a query of the user 701 "What kind of movie do you want to see?" a neighbor answer may be "How about the movie OO?" and an answer prepared by the AI agent may be "How about the movie XX?" The reliability measurement module 610 may identify rating information about the movie OO and the movie XX from the general model 618. The reliability measurement module 610 may give a first reliability to the neighbor answer "How about the movie OO?" and may give a second reliability to the agent answer "How about the movie XX?" based on the identified rating information. When the first reliability is higher than the second reliability, the AI agent may provide the prepared neighbor answer to the user 701. When the first reliability is lower than or equal to the second reliability, the AI agent may provide the prepared agent answer to the user 701.

At least one of the modules 601 to 615 may be stored as instructions in the memory 688 (e.g., the memory 130 of FIG. 1) and may be executed by the processor 699 (e.g., the processor 120 of FIG. 1). At least one of the modules 601 to 615 may be executed by a processor (e.g., the coprocessor 123) specializing in processing an artificial intelligence model. At least one of the modules 601 to 615 may be omitted from the electronic device 600 and may instead be configured in an external device. For example, at least one of the modules 603 to 612, 614, and 615 may be configured in the external device (e.g., the server 108 of FIG. 1 or the intelligent server 302 of FIG. 3). For example, the NLU 607 and the NLG 608 may be configured in the external device. The processor 699 may transmit an input value (e.g., the user text data 721 and the neighbor text data 722) to be entered into the NLU 607 to the external device through the wireless communication circuit. The processor 699 may transmit an input value (e.g., the preference 761) to be entered into the NLG 608 to the external device through the wireless communication circuit. The processor 699 may receive a result value (e.g., the neighbor answer 742) output from the NLU 607 and/or a result value (e.g., the answer 741 of the AI agent) output from the NLG 608 from the external device through the wireless communication circuit. At least one of the models 617 to 619 may be omitted from the electronic device 600 and may instead be configured in the external device (e.g., the server 108 of FIG. 1 or the intelligent server 302 of FIG. 3). For example, the general model 618 may be provided in the external device. The processor 699 may transmit an input value (e.g., a user utterance) to be entered into the general model 618 to the external device through the wireless communication circuit. The processor 699 may receive a result value (e.g., general preference information) output from the general model 618 from the external device through the wireless communication circuit.

Figure 8:
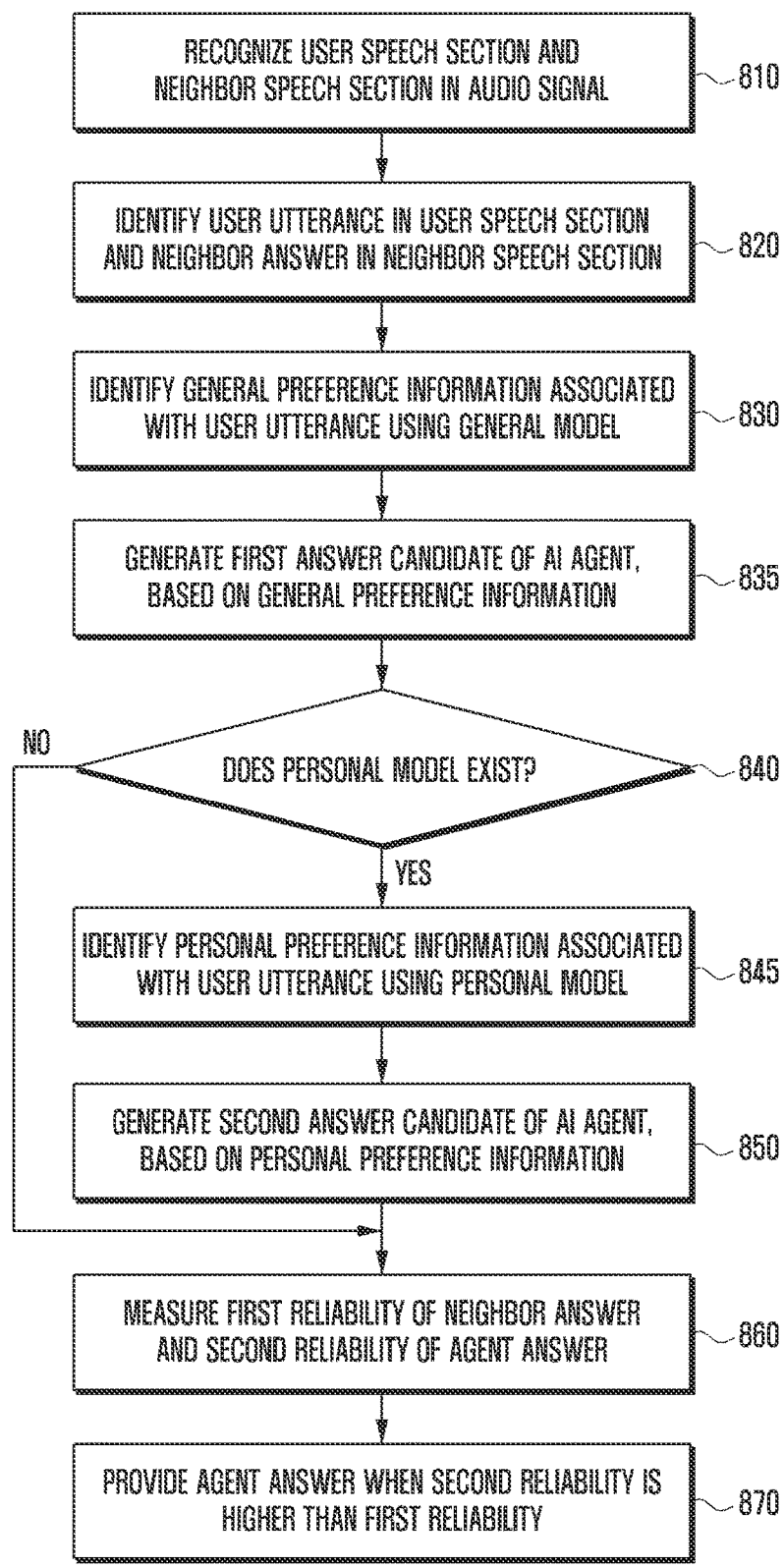
FIG. 8 is a flowchart illustrating operations of a processor for an AI agent to participate in a conversation between a user and a neighbor according to an embodiment of the disclosure.

FIG. 8 is a flowchart illustrating operations of a processor for an AI agent to participate in a conversation between a user and a neighbor according to an embodiment of the disclosure.

Referring to FIG. 8, in operation 810, the processor 699 may recognize a speech section of the user and a speech section of the neighbor in an audio signal received from a microphone.

In operation 820, the processor 699 may analyze (e.g., syntactic analysis and/or semantic analysis) a voice signal in the speech section of the user, thereby identifying a user utterance. In addition, the processor 699 may analyze a voice signal in the speech section of the neighbor, thereby identifying a neighbor utterance in response to the user.

In operation 830, the processor 699 may identify general preference information associated with the user utterance using a general model (e.g., the general model 618 of FIG. 6). For example, when the user utterance is recognized as a movie recommendation, the processor 699 may identify a movie that is the most popular in the age group of the user, a movie having a good rating, or a movie that a largest number of viewers have watched currently in the general model. In operation 835, the processor 699 may generate a first answer candidate of the AI agent to be provided by the AI agent to the user in response to the user utterance using information retrieved from a knowledge database, based on the user utterance and the general preference information. For example, the processor 699 may generate "The movie XX is the most popular," "The movie YY movie has a good rating," or "The movie ZZ is currently ranked first" as the first answer candidate, based on the general preference information.

In operation 840, the processor 699 may identify whether there is a personal model (e.g., the personal model 617 of FIG. 6) personalized to the user. When the personal model exists, the processor 699 may identify personal preference information associated with the user utterance using the personal model in operation 845. For example, when the user utterance is recognized as a movie recommendation, the processor 699 may identify which genre of movie the user 701 prefers the most in the personal model 617. In operation 850, the processor 699 may generate a second answer candidate of the AI agent using information retrieved from the knowledge database, based on the user utterance and the personal preference information.

In operation 860, the processor 699 may measure the first reliability of a neighbor answer and the second reliability of an agent answer, based on preference information. The second answer candidate is a priority as a reliability measurement target, and when the second answer candidate is not generated due to no personal model, the first answer candidate may be selected as the reliability measurement target.

In operation 870, the processor 699 may provide the agent answer through a speaker as the second reliability is higher than the first reliability. When the second reliability level is lower than or equal to the first reliability level, the processor 699 may not respond to the user utterance.

Figure 9:
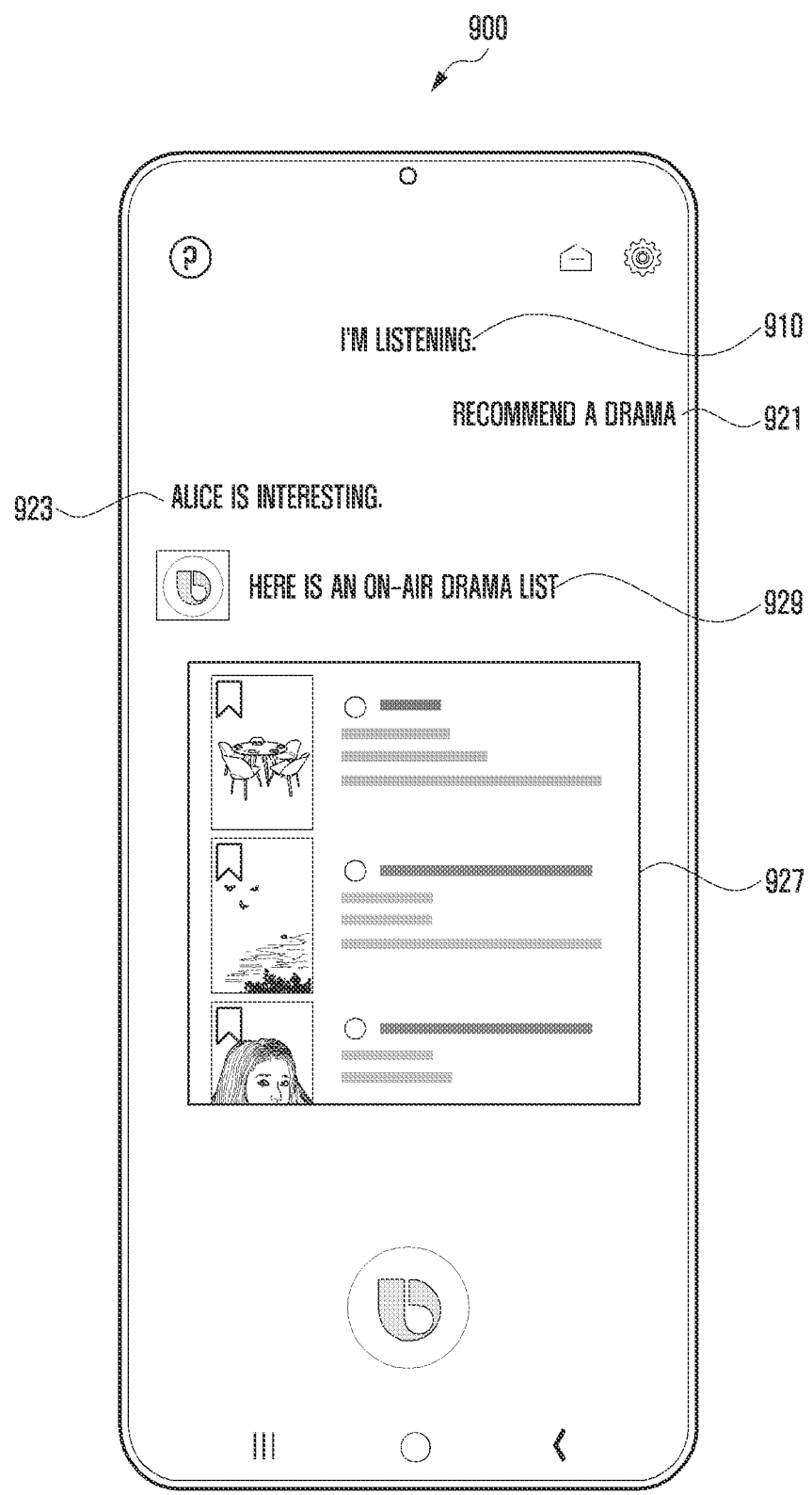
FIGS. 9, 10, and 11 illustrate user interface (UI) screens providing an agent answer during a conversation between a user and a neighbor according to various embodiments of the disclosure.
Figure 10:
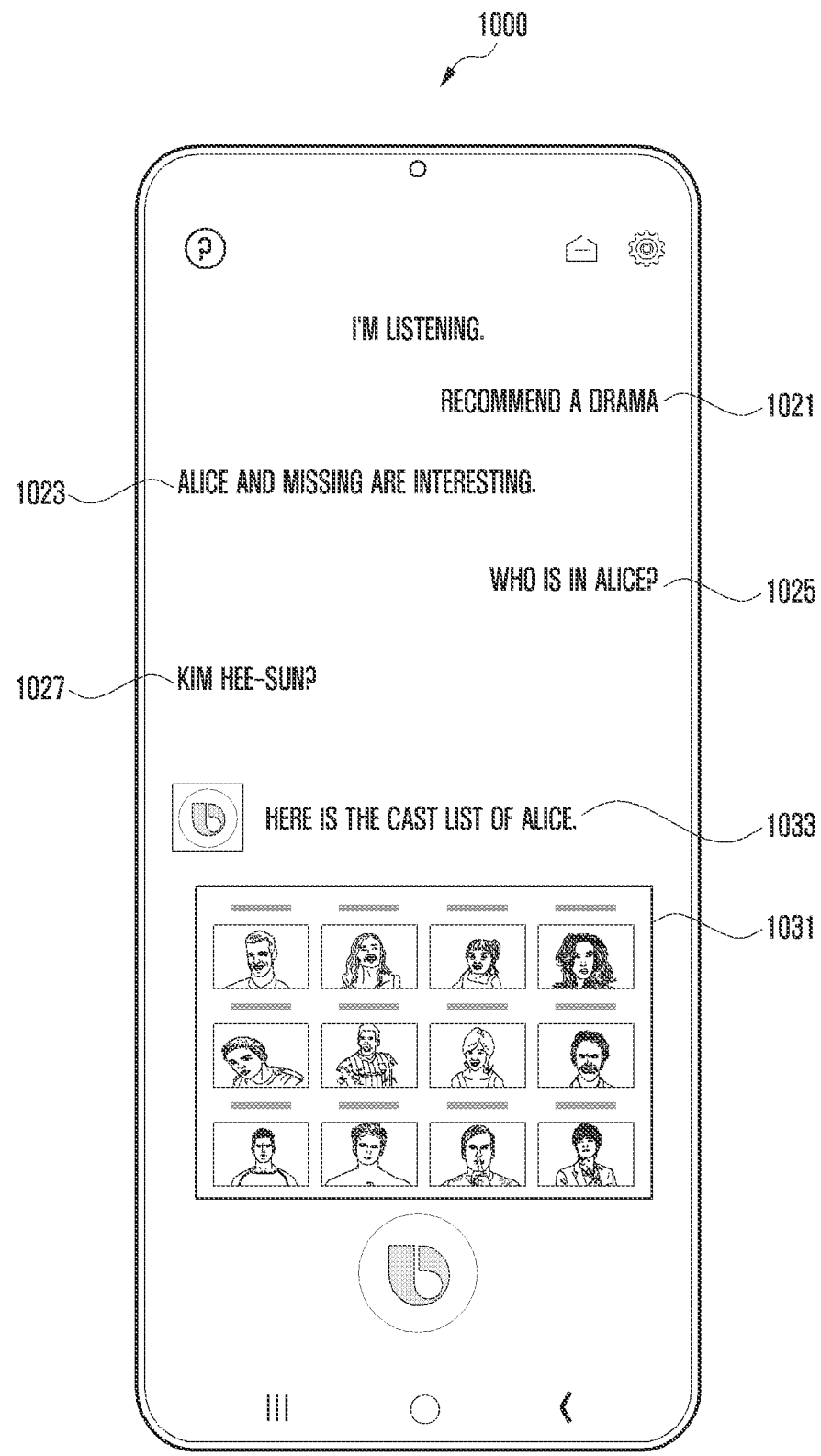
Figure 11:
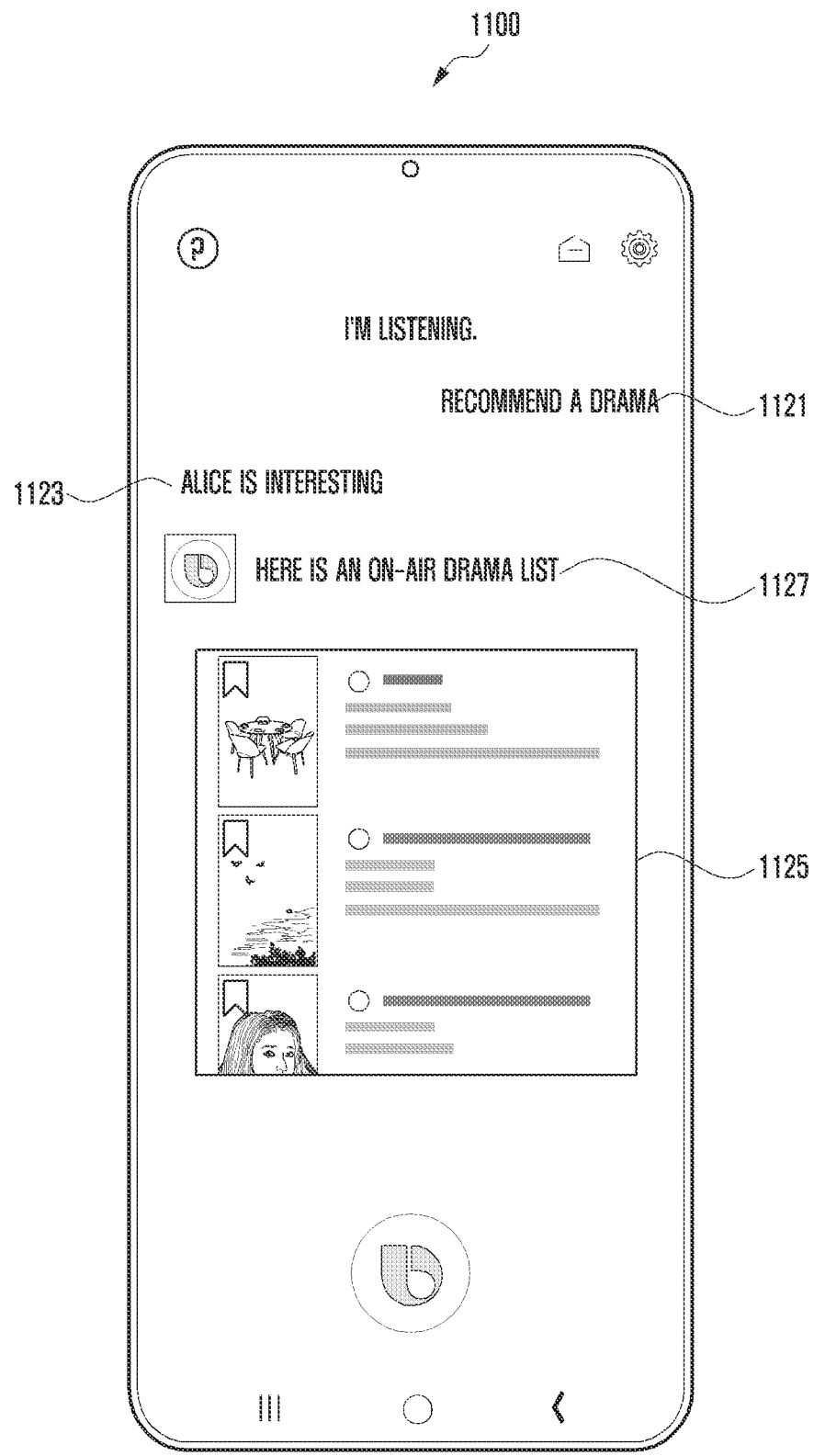

FIGS. 9, 10, and 11 illustrate user interface (UI) screens providing an agent answer during a conversation between a user and a neighbor according to various embodiments of the disclosure.

Referring to FIG. 9, the processor 699 may provide the user with a UI screen 900 including an indicator 910 that allows the user to recognize that the AI agent is performing the continuous conversation mode. The processor 699 may identify a user query 921 and a neighbor answer 923 in response to the user query 921 in an audio signal received from a microphone. The processor 699 may dispose the user query 921 and the neighbor answer 923 on the UI screen 900 in a discriminative manner. For example, the processor 699 may dispose the user query 921 on the right side of the screen and the neighbor answer 923 on the left side of the screen. The processor 699 may retrieve information to be provided for the user from a knowledge database, based on the identified user query 921 and personal preference information of the user (e.g., a drama genre preferred by the user) obtained from the personal model in relation to the user query 921. The processor 699 may provide an agent answer including the retrieved information 927 and an agent utterance 929 to the user through the UI screen 900.

Referring to FIG. 10, the processor 699 may identify a first user query 1021 and a first neighbor answer 1023 in response thereto in an audio signal received from a microphone. The processor 699 may generate a first agent answer in response to the first user query 1021. The processor 699 may measure the first reliability of the first neighbor answer 1023 and the second reliability of the first agent answer, based on personal preference information of the user obtained from a personal model in relation to the first user query 1021. As the second reliability is not higher than the first reliability, the processor 699 may not respond to the first user query 1021. Subsequently, the processor 699 may identify a second user query 1025 and a second neighbor answer 1027 in response thereto received from the microphone. The processor 699 may generate a second agent answer in response to the second user query 1025. The processor 699 may measure the third reliability of the second neighbor answer 1027 and the fourth reliability of the second agent answer in the same manner as when measuring the above reliabilities. As the fourth reliability is higher than the third reliability, the processor 699 may provide the second agent answer including retrieved information 1031 and an agent utterance 1033 to the user through a UI screen 1000.

Referring to FIG. 11, the processor 699 may identify a user query 1121 and a neighbor answer 1123 in response thereto in an audio signal received from a microphone. The processor 699 may retrieve information to be provided for the user from a knowledge database, based on the identified user query 1121 and general preference information (e.g., a drama genre preferred by women in their 20s like the user) obtained from a general model in relation to the user query 1121. The processor 699 may provide an agent answer including the retrieved information 1125 and an agent utterance 1127 to the user through a UI screen 1100.

Figure 12:
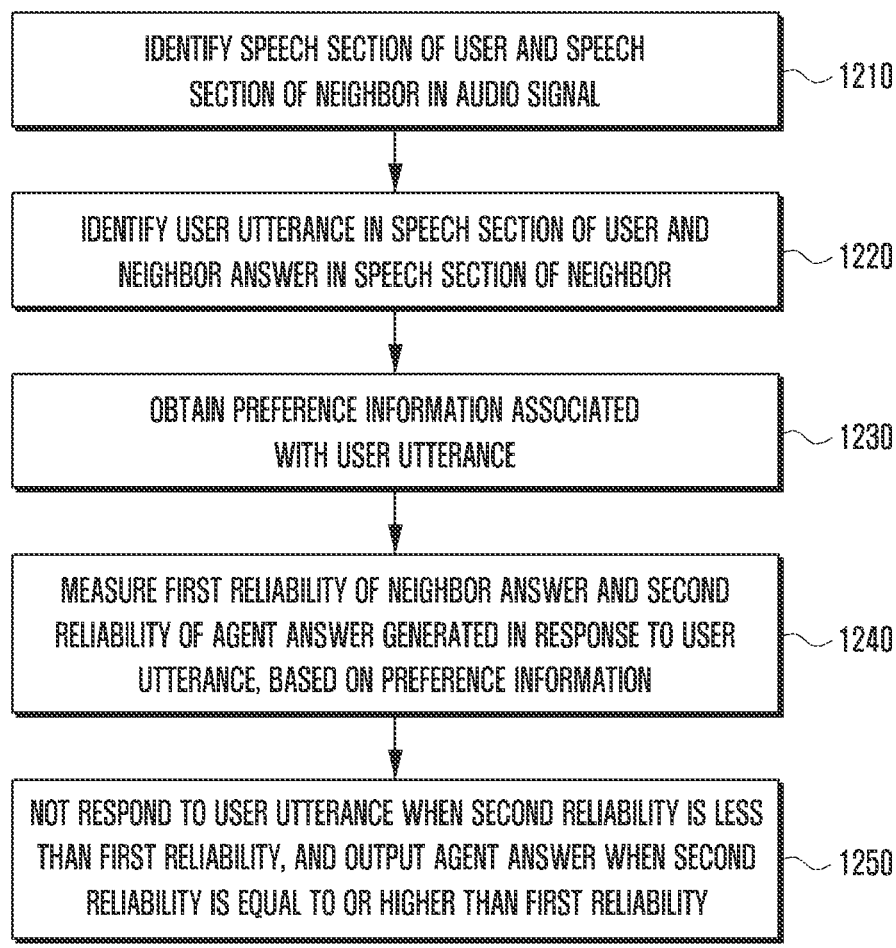
FIG. 12 is a flowchart illustrating operations of a processor for an AI agent to participate in a conversation between a user and a neighbor according to an embodiment of the disclosure.

FIG. 12 is a flowchart illustrating operations of a processor for an AI agent to participate in a conversation between a user and a neighbor according to an embodiment of the disclosure.

Referring to FIG. 12, in operation 1210, the processor 699 may identify a speech section of the user and a speech section of the neighbor in an audio signal received from a microphone. Here, the microphone may be an internal microphone configured in the electronic device 600 or an external microphone connected to the electronic device 600 through a wireless communication circuit or an audio connector.

In operation 1220, the processor 699 may identify a user utterance in the speech section of the user and a neighbor answer in the speech section of the neighbor through semantic and/or grammatical analysis.

In operation 1230, the processor 699 may obtain preference information associated with the user utterance. For example, the processor 699 may obtain personal preference information associated with the user utterance using an artificial intelligence model (e.g., the personal model 617 of FIG. 6) personalized to the user in relation to the user's preference. When there is no artificial intelligence model personalized to the user, the processor 699 may identify general preference information associated with the user utterance using a generalized artificial intelligence model (e.g., the general model 618 of FIG. 6) in relation to a preference of a plurality of unspecified persons.

In operation 1240, the processor 699 may give a first reliability to the neighbor answer and a second reliability to an agent answer generated in response to the user utterance, based on the identified preference information (e.g., in proportion to a preference).

In operation 1250, the processor 699 may not respond to the user utterance when the second reliability is less than the first reliability, and may output the agent answer through a speaker when the second reliability is equal to or higher than the first reliability. Here, the speaker may be an internal speaker configured in the electronic device 600 or an external speaker connected to the electronic device 600 through the wireless communication circuit or the audio connector.

Figure 13:
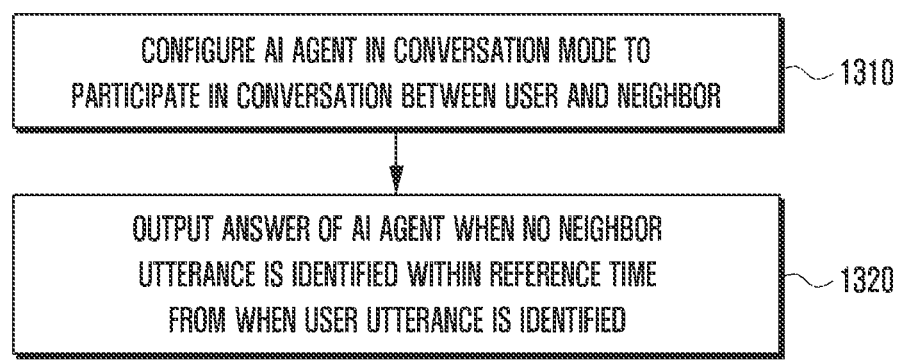
FIG. 13 is a flowchart illustrating operations of a processor for an AI agent to participate in a conversation between a user and a neighbor according to an embodiment of the disclosure.

FIG. 13 is a flowchart illustrating operations of a processor for an AI agent to participate in a conversation between a user and a neighbor according to an embodiment of the disclosure.

Referring to FIG. 13, in operation 1310, the processor 699 may configure the AI agent in a conversation mode to participate in the conversation between the user and the neighbor. For example, after the AI agent is called, the processor 699 may identify a user utterance commanding the continuous conversation mode in an audio signal received from a microphone. Here, the microphone may be an internal microphone configured in the electronic device 600 or an external microphone connected to the electronic device 600 through a wireless communication circuit or an audio connector. During the configured conversation mode, the processor 699 may participate in the conversation between the user and the neighbor.

In operation 1320, the processor 699 may identify a user utterance in an audio signal received from the microphone. When no neighbor utterance is identified in an audio signal received from the microphone within a designated reference time (e.g., hangover time) from when the user utterance is identified, the processor 699 may output an answer of the AI agent generated in response to the user utterance through a speaker. Here, the speaker may be an internal speaker configured in the electronic device 600 or an external speaker connected to the electronic device 600 through the wireless communication circuit or the audio connector.

Figure 14:
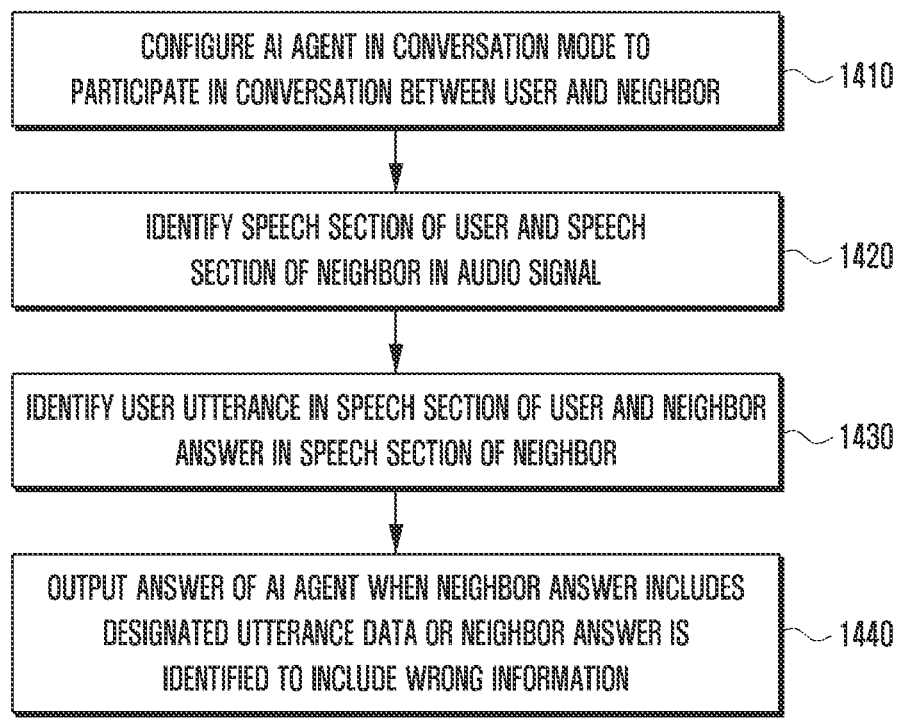
FIG. 14 is a flowchart illustrating operations of a processor for an AI agent to participate in a conversation between a user and a neighbor according to an embodiment of the disclosure.

FIG. 14 is a flowchart illustrating operations of a processor for an AI agent to participate in a conversation between a user and a neighbor according to an embodiment of the disclosure.

Referring to FIG. 14, in operation 1410, the processor 699 may configure the AI agent in a conversation mode to participate in the conversation between the user and the neighbor. For example, after the AI agent is called, the processor 699 may identify a user utterance commanding the continuous conversation mode in an audio signal received from a microphone. Here, the microphone may be an internal microphone configured in the electronic device 600 or an external microphone connected to the electronic device 600 through a wireless communication circuit or an audio connector. During the configured conversation mode, the processor 699 may participate in the conversation between the user and the neighbor.

In operation 1420, the processor 699 may identify a speech section of the user and a speech section of the neighbor in an audio signal received from the microphone.

In operation 1430, the processor 699 may identify a user utterance in the speech section of the user and a neighbor answer in the speech section of the neighbor through semantic and/or grammatical analysis.

When the neighbor answer includes designated utterance data (e.g., I don't know, um, or ah) or it is identified through a knowledge database that the neighbor answer includes wrong information, the processor 699 may output an answer of the AI agent generated in response to the user utterance through a speaker in operation 1440. Here, the speaker may be an internal speaker configured in the electronic device 600 or an external speaker connected to the electronic device 600 through the wireless communication circuit or the audio connector.

According to various embodiments, an electronic device may include: a speaker; a microphone; an audio connector; a wireless communication circuit; a processor configured to be operatively connected to the speaker, the microphone, the audio connector, and the wireless communication circuit; and a memory configured to be operatively connected to the processor, wherein the memory may store instructions that, when executed, cause the processor to identify a speech section of a user and a speech section of a neighbor in an audio signal received through the microphone, the audio connector, or the wireless communication circuit, identify a user utterance in the speech section of the user and a neighbor answer to the user utterance in the speech section of the neighbor, obtain preference information associated with the user utterance, give a first reliability to the neighbor answer and a second reliability to an agent answer of an artificial intelligence (AI) agent generated in response to the user utterance, based on the preference information, not respond to the user utterance when the second reliability is lower than the first reliability, and output the agent answer through the speaker, the audio connector, or the wireless communication circuit when the second reliability is equal to or higher than the first reliability.

The instructions may cause the processor to obtain the preference information associated with the user utterance using an artificial intelligence model (e.g., the personal model 617) personalized in relation to a preference of the user.

The instructions may cause the processor to obtain the preference information associated with the user utterance using an artificial intelligence model (e.g., the general model 618) generalized in relation to a preference of a plurality of unspecified persons when there is no artificial intelligence model personalized to the user.

The instructions may cause the processor to identify a positive or negative response of the user to the output agent answer in the speech section of the user, and update the personalized model, based on the identified response.

The instructions may cause the processor to configure the AI agent in a conversation mode of participating in a conversation between the user and the neighbor when a designated first utterance is identified in the speech section of the user, and terminate the conversation mode when a designated second utterance is identified in the speech section of the user.

The instructions may cause the processor to output a designated agent answer through the speaker, the audio connector, or the wireless communication circuit when a designated third utterance (e.g., Are you listening?) is identified in the speech section of the user while the AI agent is configured in the conversation mode.

The instructions may cause the processor to output the user utterance and the neighbor answer through a display, and output the agent answer through the display when the second reliability is equal to or higher than the first reliability.

The instructions may cause the processor to identify the speech section of the user and the speech section of the neighbor in the audio signal using an artificial intelligence model (e.g., the user verification model 616) trained to find a voice of the user.

According to various embodiments, a method for operating an electronic device may include: identifying a speech section of a user and a speech section of a neighbor in an audio signal received through a microphone, an audio connector, or a wireless communication circuit provided in the electronic device; identifying a user utterance in the speech section of the user and a neighbor answer to the user utterance in the speech section of the neighbor; obtaining preference information associated with the user utterance; giving a first reliability to the neighbor answer and a second reliability to an agent answer of an artificial intelligence (AI) agent generated in response to the user utterance, based on the preference information; and outputting the agent answer through the speaker, the audio connector, or the wireless communication circuit when the second reliability is equal to or higher than the first reliability, without responding to the user utterance when the second reliability is lower than the first reliability.

The obtaining of the preference information may include obtaining the preference information associated with the user utterance using an artificial intelligence model personalized in relation to a preference of the user.

The obtaining of the preference information may include obtaining the preference information associated with the user utterance using an artificial intelligence model generalized in relation to a preference of a plurality of unspecified persons when there is no artificial intelligence model personalized to the user.

The method may further include: identifying a positive or negative response of the user to the output agent answer in the speech section of the user; and updating the personalized model, based on the identified response.

The method may further include: configuring the AI agent in a conversation mode of participating in a conversation between the user and the neighbor when a designated first utterance is identified in the speech section of the user; and terminating the conversation mode when a designated second utterance is identified in the speech section of the user.

The method may further include outputting a designated agent answer through the speaker, the audio connector, or the wireless communication circuit when a designated third utterance is identified in the speech section of the user while the AI agent is configured in the conversation mode.

The method may further include: outputting the user utterance and the neighbor answer through a display; and outputting the agent answer through the display when the second reliability is equal to or higher than the first reliability.

The identifying of the speech section of the user and the speech section of the neighbor may include identifying the speech section of the user and the speech section of the neighbor in the audio signal using an artificial intelligence model trained to find a voice of the user.

According to various embodiments, an electronic device may include: a speaker; a microphone; an audio connector; a wireless communication circuit; a processor configured to be operatively connected to the speaker, the microphone, the audio connector, and the wireless communication circuit; and a memory configured to be operatively connected to the processor, wherein the memory may store instructions that, when executed, cause the processor to: configure an artificial intelligence (AI) agent in a conversation mode of participating in a conversation between a user and a neighbor after the AI agent is called; and identify an utterance of the user in an audio signal received through the microphone, the audio connector, or the wireless communication circuit, and output an answer of the AI agent generated in response to the utterance of the user through the speaker, the audio connector, or the wireless communication circuit when an utterance of the neighbor is not identified in an audio signal received through the microphone, the audio connector, or the wireless communication circuit within a designated reference time (e.g., hangover time) from when the utterance of the user is identified, while the AI agent is configured in the conversation mode.

According to various embodiments, an electronic device may include: a speaker; a microphone; an audio connector; a wireless communication circuit; a processor configured to be operatively connected to the speaker, the microphone, the audio connector, and the wireless communication circuit; and a memory configured to be operatively connected to the processor, wherein the memory may store instructions that, when executed, cause the processor to configure an artificial intelligence (AI) agent in a conversation mode of participating in a conversation between a user and a neighbor after the AI agent is called; and identify a speech section of the user and a speech section of the neighbor in an audio signal received through the microphone, the audio connector, or the wireless communication circuit, identify a user utterance in the speech section of the user and a neighbor answer to the user utterance in the speech section of the neighbor, and output an answer of the AI agent generated in response to the user utterance through the speaker, the audio connector, or the wireless communication circuit when the neighbor answer includes designated utterance data (e.g., I don't know, um, or ah) or it is identified that the neighbor answer includes wrong information, while the AI agent is configured in the conversation mode.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a speaker;
   a microphone;
   an audio connector;
   a wireless communication circuit;
   a processor configured to be operatively connected to the speaker, the microphone, the audio connector, and the wireless communication circuit; and
   a memory configured to be operatively connected to the processor, wherein the memory stores instructions that, when executed, cause the processor to:
      identify a speech section of a user and a speech section of a neighbor in an audio signal received through the microphone, the audio connector, or the wireless communication circuit,
      identify a user utterance in the speech section of the user and a neighbor answer to the user utterance in the speech section of the neighbor,
      obtain user preference information associated with the user utterance,
      determine a first reliability value to the neighbor answer and a second reliability value to an agent answer of an artificial intelligence (AI) agent generated in response to the user utterance, based on the user preference information, wherein the first reliability value and the second reliability value are numerical values determined by a reliability measurement method,
      compare the first reliability value with the second reliability value; and
      not respond to the user utterance when the second reliability value is lower than the first reliability value, and
      output the agent answer through the speaker, the audio connector, or the wireless communication circuit when the second reliability value is equal to or higher than the first reliability value.

2. The electronic device of claim 1, wherein the instructions cause the processor to obtain the user preference information associated with the user utterance using an artificial intelligence model personalized in relation to a preference of the user.

3. The electronic device of claim 2, wherein the instructions cause the processor to obtain the user preference information associated with the user utterance using an artificial intelligence model generalized in relation to a preference of a plurality of unspecified persons when there is no artificial intelligence model personalized to the user.

4. The electronic device of claim 2, wherein the instructions cause the processor to:
   identify a positive or negative response of the user to the output agent answer in the speech section of the user, and
   update the personalized model, based on the identified response.

5. The electronic device of claim 1, wherein the instructions cause the processor to:
   configure the AI agent in a conversation mode of participating in a conversation between the user and the neighbor when a designated first utterance is identified in the speech section of the user, and
   terminate the conversation mode when a designated second utterance is identified in the speech section of the user.

6. The electronic device of claim 5, wherein the instructions cause the processor to output a designated agent answer through the speaker, the audio connector, or the wireless communication circuit when a designated third utterance is identified in the speech section of the user while the AI agent is configured in the conversation mode.

7. The electronic device of claim 1, wherein the instructions cause the processor to:
   output the user utterance and the neighbor answer through a display, and
   output the agent answer through the display when the second reliability is equal to or higher than the first reliability.

8. The electronic device of claim 1, wherein the instructions cause the processor to identify the speech section of the user and the speech section of the neighbor in the audio signal using an artificial intelligence model trained to find a voice of the user.

9. A method for operating an electronic device, the method comprising:
   identifying a speech section of a user and a speech section of a neighbor in an audio signal received through a microphone, an audio connector, or a wireless communication circuit provided in the electronic device;
   identifying a user utterance in the speech section of the user and a neighbor answer to the user utterance in the speech section of the neighbor;
   obtaining user preference information associated with the user utterance;
   determining a first reliability value to the neighbor answer and a second reliability value to an agent answer of an artificial intelligence (AI) agent generated in response to the user utterance, based on the user preference information, wherein the first reliability value and the second reliability value are numerical values determined by a reliability measurement method;
   comparing the first reliability value with the second reliability value; and
   outputting the agent answer through a speaker, the audio connector, or the wireless communication circuit when the second reliability value is equal to or higher than the first reliability value, without responding to the user utterance when the second reliability value is lower than the first reliability value.

10. The method of claim 9, wherein the obtaining of the user preference information comprises obtaining the user preference information associated with the user utterance using an artificial intelligence model personalized in relation to a preference of the user.

11. The method of claim 10, further comprising:
identifying a positive or negative response of the user to the output agent answer in the speech section of the user; and
updating the personalized model, based on the identified response.

12. The method of claim 11, wherein the identifying of the positive or negative response comprises recognizing a voice signal indicating a user emotion.

13. The method of claim 10, further comprising generating a second answer candidate of the AI agent based on the personalized AI model.

14. The method of claim 9, further comprising:
configuring the AI agent in a conversation mode of participating in a conversation between the user and the neighbor when a designated first utterance is identified in the speech section of the user; and
terminating the conversation mode when a designated second utterance is identified in the speech section of the user.

15. The method of claim 9, further comprising:
outputting the user utterance and the neighbor answer through a display; and
outputting the agent answer through the display when the second reliability is equal to or higher than the first reliability.

16. The method of claim 9, wherein the identifying of the speech section of the user and the speech section of the neighbor comprises identifying the speech section of the user and the speech section of the neighbor in the audio signal using an artificial intelligence model trained to find a voice of the user.

17. The method of claim 16, further comprising outputting the agent answer in response to no neighbor utterance being identified within a reference time from when the user utterance is identified.

18. The method of claim 16, further comprising outputting the agent answer in response to the neighbor answer being identified to include wrong information.

* * * * *